(12) United States Patent
Chen et al.

(10) Patent No.: US 8,904,732 B2
(45) Date of Patent: Dec. 9, 2014

(54) CEMENTITIOUS TRIM ARTICLES

(75) Inventors: Hong Chen, Alto Loma, CA (US); Chongjun Jiang, Alta Loma, CA (US); Jong Min Keum, Rancho Cucamonga, CA (US); Caidian Luo, Alta Loma, CA (US); Shan Ren, Moreno Valley, CA (US); Daniel Jose Suasnabar, Rancho Cucamonga, CA (US); Bryan Louis Walters, Anaheim, CA (US)

(73) Assignee: James Hardie Technology Limited, Dublin (IE)

( * ) Notice: Subject to any disclaimer, the term of this patent is extended or adjusted under 35 U.S.C. 154(b) by 633 days.

(21) Appl. No.: 12/754,567

(22) Filed: Apr. 5, 2010

(65) Prior Publication Data

US 2010/0251632 A1    Oct. 7, 2010

Related U.S. Application Data

(60) Provisional application No. 61/166,427, filed on Apr. 3, 2009.

(51) Int. Cl.
*E04F 19/02* (2006.01)
*F16B 5/00* (2006.01)
(Continued)

(52) U.S. Cl.
CPC ............... *B28B 3/26* (2013.01); *F16B 5/0024* (2013.01); *E04D 13/152* (2013.01); *E04F 13/141* (2013.01); *C04B 28/02* (2013.01); *C04B 20/02* (2013.01); *E04F 2019/0418* (2013.01); *C04B 2103/48* (2013.01); *B28B 11/125* (2013.01); *E04F 2201/0505* (2013.01); *C04B 2103/10* (2013.01); *C04B 2111/40* (2013.01); *E04F 15/08* (2013.01); *E04F 19/04* (2013.01); *B28B 11/08* (2013.01); *C04B 2201/20* (2013.01)

USPC ......... 52/716.1; 52/717.01; 52/848; 52/287.1

(58) Field of Classification Search
CPC ................ E04F 2049/0418; E04F 2049/0454; B32B 3/263; B32B 3/30
USPC ........ 52/596, 600, 601, 602, 605, 606, 585.1, 52/716.01, 717.01, 717.04, 848, 793.1, 52/309.7, 309.12, 309.16, 309.17, 290, 52/630, 852, 716.1; 428/156, 188; D25/125, 136
See application file for complete search history.

(56) References Cited

U.S. PATENT DOCUMENTS 1,068,338 A * 7/1913 Hardoncourt .................... 52/100
1,329,292 A * 1/1920 Christin .......................... 52/600
(Continued)

FOREIGN PATENT DOCUMENTS

DE     22 25 413 A1    12/1873
DE     299 04 194 U1 *  8/2000
(Continued)

OTHER PUBLICATIONS

Machine translation of Japanese 7-317191, 4 pages, translated Jul. 29, 2014.*

(Continued)

*Primary Examiner* — Robert Canfield
(74) *Attorney, Agent, or Firm* — Knobbe, Martens, Olson & Bear, LLP

(57) ABSTRACT

Described herein is a monolithic cementitious article with one or more pre-formed shaped regions. The shaped regions are generally channels that extend through a portion of the article or span the full article. The article includes one or more openings at least one of its ends. The article has a low apparent density with a high strength as well as high performance characteristics. The article when manufactured is suitable for use as a building product, such as siding, panel, trim, fascia, roofing, crown molding, decking, and fencing.

13 Claims, 15 Drawing Sheets

(51) Int. Cl.

| | | |
|---|---|---|
| *E04D 13/152* | (2006.01) | |
| *E04F 13/14* | (2006.01) | |
| *C04B 28/02* | (2006.01) | |
| *C04B 20/02* | (2006.01) | |
| *B28B 3/26* | (2006.01) | |
| *E04F 15/08* | (2006.01) | |
| *E04F 19/04* | (2006.01) | |
| *C04B 103/48* | (2006.01) | |
| *B28B 11/12* | (2006.01) | |
| *C04B 103/10* | (2006.01) | |
| *C04B 111/40* | (2006.01) | |
| *B28B 11/08* | (2006.01) | |

(56) References Cited

U.S. PATENT DOCUMENTS

| | | | | |
|---|---|---|---|---|
| 2,049,907 | A * | 8/1936 | Hess | 52/375 |
| 2,818,824 | A * | 1/1958 | Read et al. | 428/167 |
| 2,975,561 | A * | 3/1961 | Branham | 52/284 |
| 3,062,669 | A * | 11/1962 | Dilnot | 106/674 |
| 3,247,294 | A * | 4/1966 | Sabouni | 264/42 |
| 3,309,832 | A * | 3/1967 | Filsinger | 52/610 |
| 3,333,388 | A * | 8/1967 | Sandin | 52/701 |
| 3,416,272 | A * | 12/1968 | La Gue | 52/223.6 |
| 3,685,241 | A * | 8/1972 | Cooper | 52/270 |
| 3,758,319 | A * | 9/1973 | Ergene | 523/218 |
| 3,867,159 | A * | 2/1975 | Ergene | 523/218 |
| 3,883,258 | A * | 5/1975 | Hewson | 403/298 |
| 3,908,324 | A * | 9/1975 | Stout | 52/100 |
| 3,912,838 | A * | 10/1975 | Kraus et al. | 427/426 |
| 4,306,395 | A * | 12/1981 | Carpenter | 52/223.6 |
| 4,351,670 | A * | 9/1982 | Grice | 106/672 |
| 4,465,719 | A * | 8/1984 | Grice | 428/70 |
| 4,524,211 | A * | 6/1985 | Genba et al. | 264/211 |
| 4,641,467 | A * | 2/1987 | Dupuis, Jr. | 52/297 |
| 4,828,618 | A * | 5/1989 | De Chiffre et al. | 106/642 |
| 4,947,610 | A * | 8/1990 | Koerner | 52/585.1 |
| 5,047,086 | A * | 9/1991 | Hayakawa et al. | 106/731 |
| 5,076,978 | A * | 12/1991 | Blum | 264/42 |
| 5,108,679 | A * | 4/1992 | Rirsch et al. | 264/118 |
| 5,177,924 | A * | 1/1993 | Kakuk | 52/606 |
| 5,330,694 | A * | 7/1994 | Iwaya | 264/112 |
| 5,545,297 | A | 8/1996 | Andersen et al. | |
| 5,658,624 | A * | 8/1997 | Anderson et al. | 428/34.7 |
| 5,693,409 | A * | 12/1997 | Gnatowski et al. | 428/212 |
| 5,772,185 | A * | 6/1998 | Pulsipher | 256/59 |
| 5,787,665 | A | 8/1998 | Carlin | |
| 5,806,264 | A * | 9/1998 | Boot | 52/415 |
| 6,046,255 | A * | 4/2000 | Gray et al. | 523/218 |
| 6,203,609 | B1 * | 3/2001 | Castro et al. | 106/705 |
| 6,228,507 | B1 * | 5/2001 | Hahn | 428/542.2 |
| 6,438,923 | B2 * | 8/2002 | Miller | 52/745.19 |
| 6,460,213 | B1 * | 10/2002 | Flint et al. | 14/73 |
| 6,528,151 | B1 | 3/2003 | Shah | |
| 6,533,970 | B1 * | 3/2003 | Gregg | 264/37.29 |
| 6,675,545 | B2 * | 1/2004 | Chen et al. | 52/586.1 |
| 6,676,862 | B2 * | 1/2004 | Jensen | 264/39 |
| 6,763,640 | B2 * | 7/2004 | Lane | 52/300 |
| 6,773,500 | B1 * | 8/2004 | Creamer et al. | 106/672 |
| 6,893,594 | B2 * | 5/2005 | Chen | 264/211.23 |
| 7,155,866 | B2 * | 1/2007 | Bezubic et al. | 52/287.1 |
| 7,353,640 | B2 * | 4/2008 | Stutler | 52/100 |
| 7,461,490 | B2 * | 12/2008 | Toledo | 52/605 |
| 7,543,419 | B2 * | 6/2009 | Rue | 52/630 |
| 7,757,445 | B2 * | 7/2010 | Disterhof et al. | 52/223.3 |
| 8,046,958 | B2 * | 11/2011 | Saurey | 52/96 |
| 8,409,380 | B2 * | 4/2013 | Black et al. | 156/64 |
| 2003/0014931 | A1 * | 1/2003 | Hahn | 52/287.1 |
| 2005/0011159 | A1 * | 1/2005 | Standal et al. | 52/716.1 |
| 2005/0284339 | A1 * | 12/2005 | Brunton et al. | 106/713 |
| 2006/0182946 | A1 | 8/2006 | Zarb | |
| 2006/0288909 | A1 | 12/2006 | Naji | |
| 2007/0107334 | A1 | 5/2007 | Seppanen | |
| 2008/0099122 | A1 | 5/2008 | Andersen | |
| 2008/0292854 | A1 | 11/2008 | Miller | |
| 2009/0235600 | A1 * | 9/2009 | Logan et al. | 52/314 |
| 2009/0242728 | A1 * | 10/2009 | Yamazaki et al. | 249/16 |
| 2010/0136269 | A1 | 6/2010 | Andersen et al. | |

FOREIGN PATENT DOCUMENTS

| | | | |
|---|---|---|---|
| FR | 2 486 568 | A1 | 1/1982 |
| GB | 279585 | * | 11/1927 |
| JP | 6-42075 | * | 2/1994 |
| JP | H06 63926 | A | 3/1994 |
| JP | 7-317191 | * | 12/1995 |
| JP | 8-68141 | * | 3/1996 |
| JP | 8-91911 | * | 4/1996 |
| JP | 2008 260157 | A | 5/2008 |

OTHER PUBLICATIONS

International Search Report for corresponding PCT application PCT/US2010/030016 dated Jun. 3, 2010 (international filed Apr. 5, 2010).
International Preliminary Report on Patentability for corresponding PCT application PCT/US2010/030016 dated Oct. 4, 2011.
Supplementary European Search Report for Application No. EP 10 75 9554, dated Sep. 4, 2013.

* cited by examiner

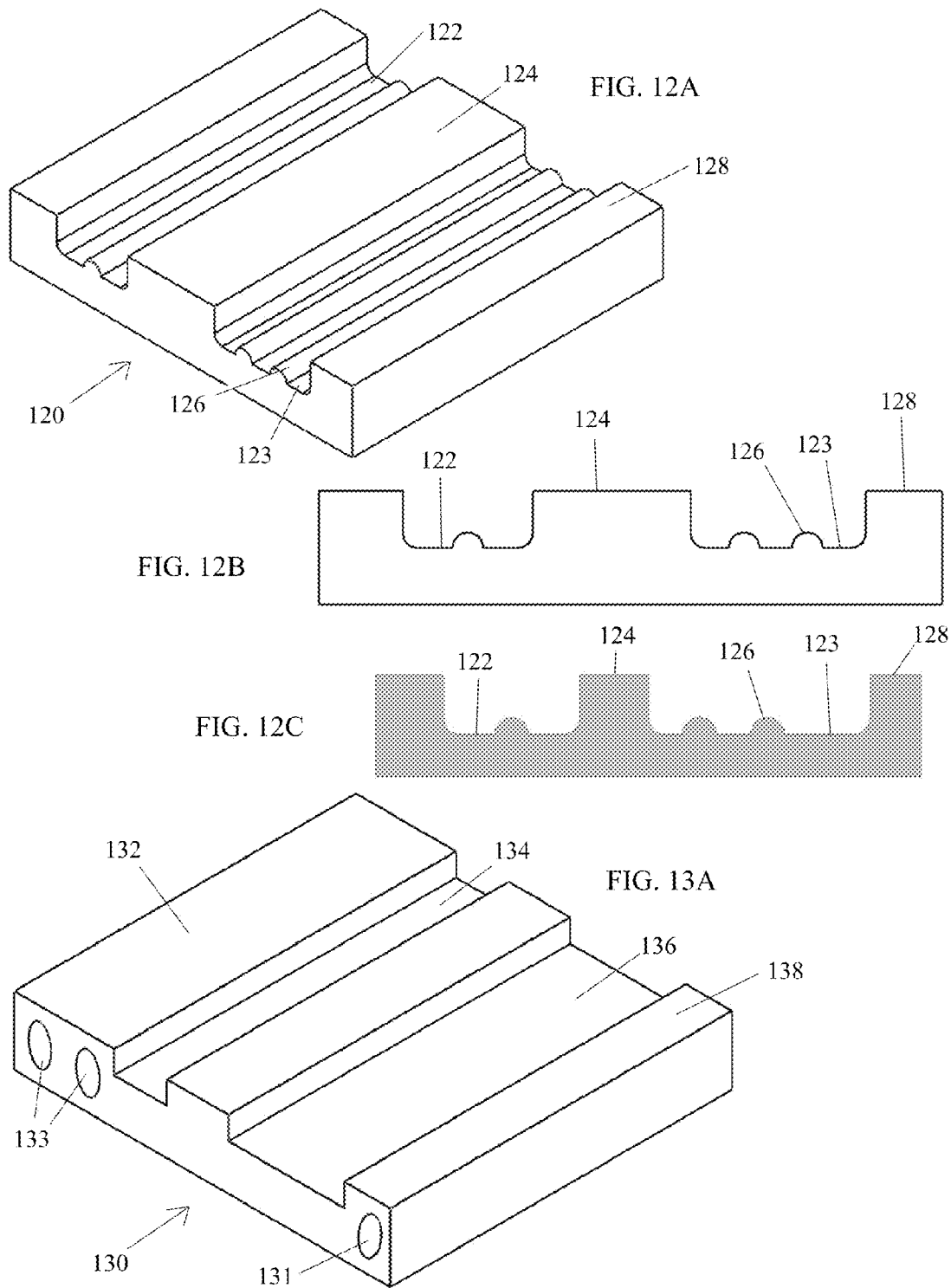

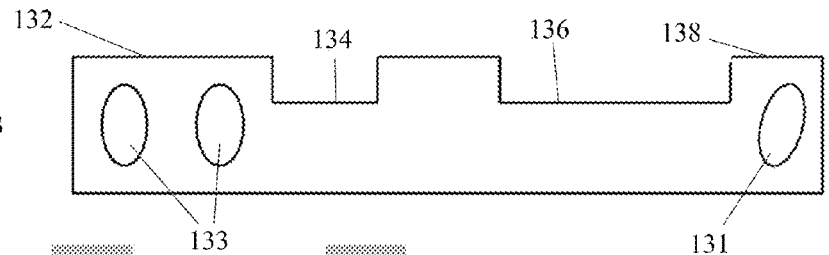
FIG. 13B
FIG. 13C
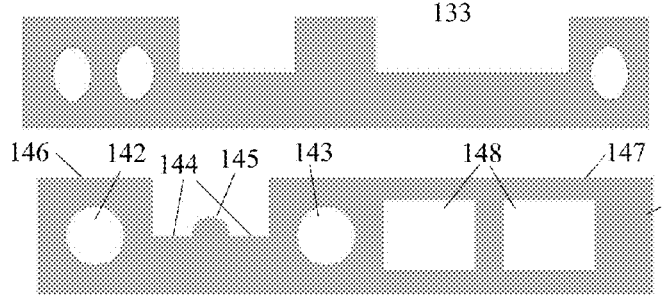
FIG. 14
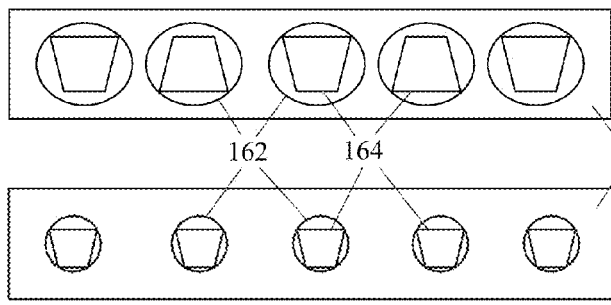
FIG. 16A
FIG. 16B
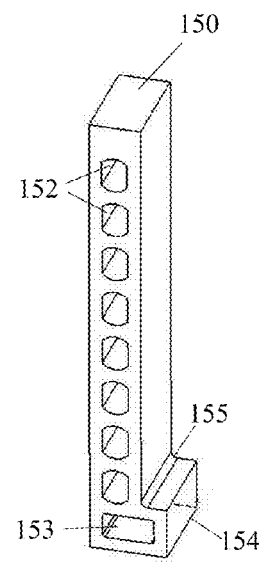
FIG. 15
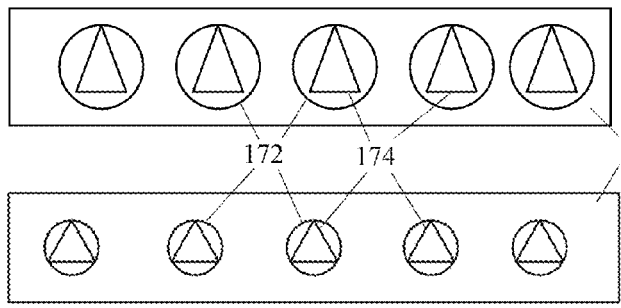
FIG. 17A
FIG. 17B
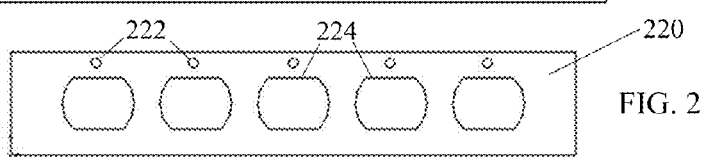
FIG. 22
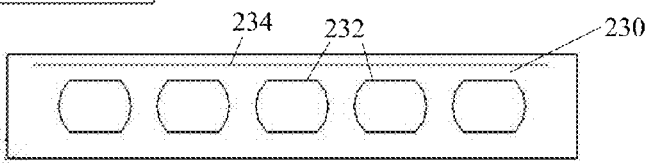
FIG. 23

FIG. 30
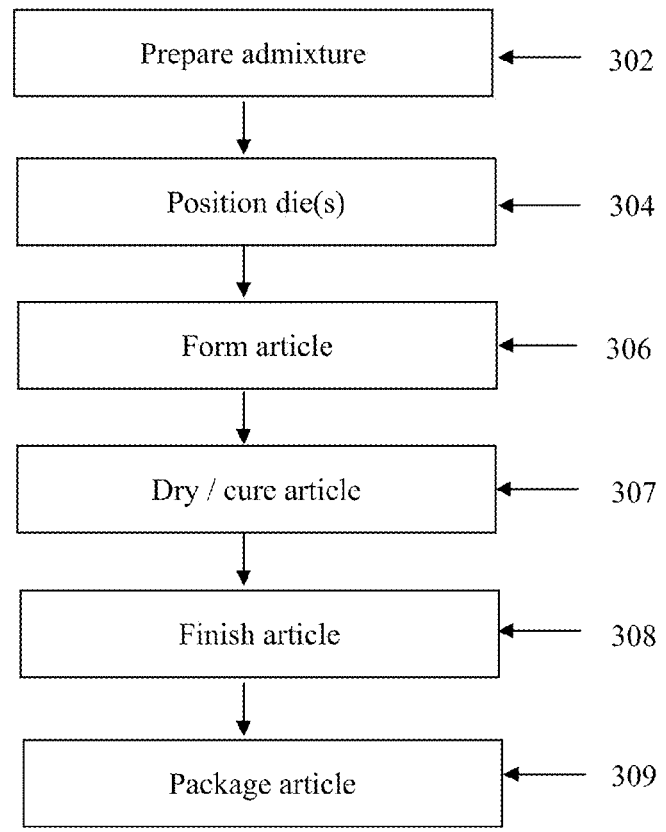
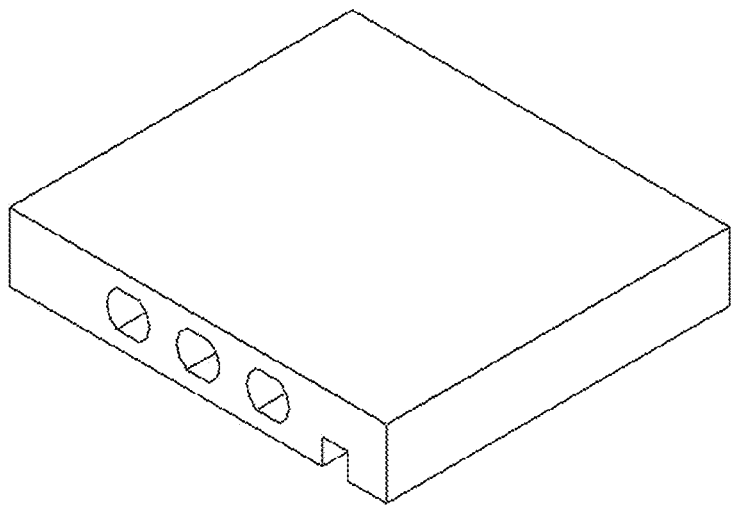
FIG. 31A
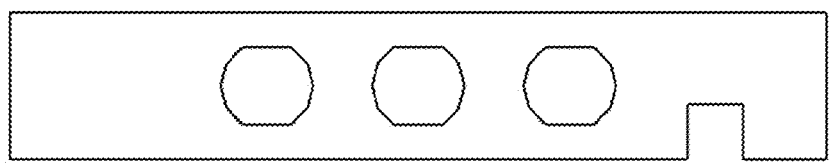
FIG. 31B

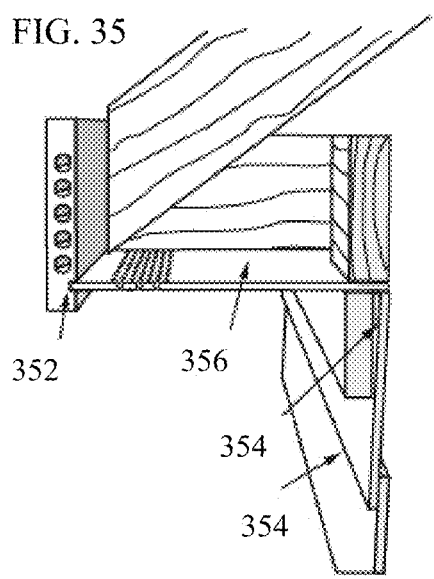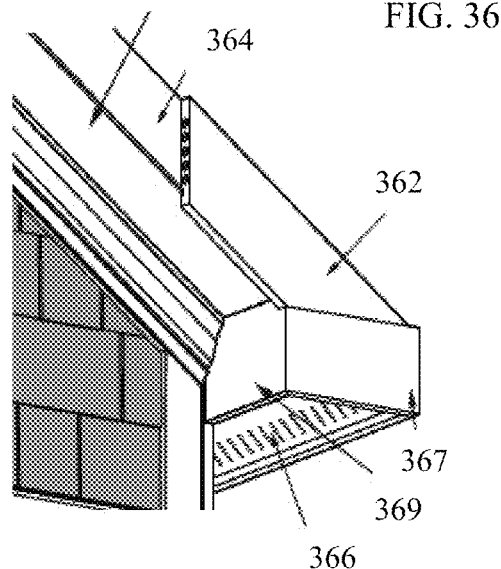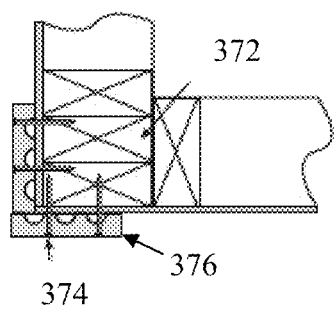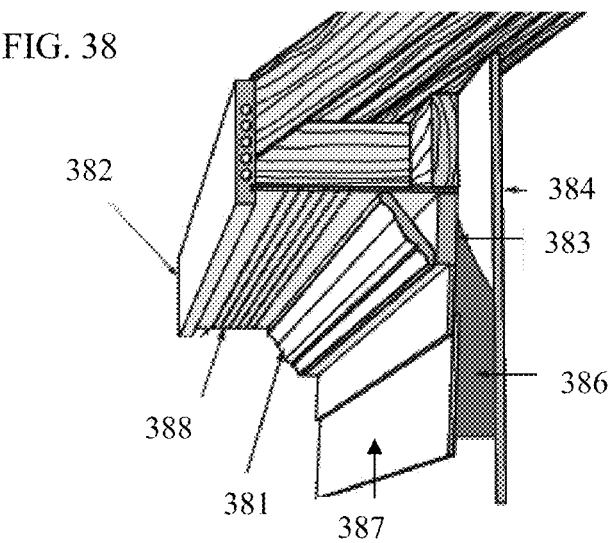

CEMENTITIOUS TRIM ARTICLES

CROSS-REFERENCE TO RELATED APPLICATION

This application claims the benefit for priority purposes from U.S. Provisional Application No. 61/166,427 filed Apr. 3, 2009, which is incorporated herein by reference in its entirety for all purposes.

BACKGROUND

The invention relates generally to cementitious articles with improved properties as well as formulations, methods of manufacturing and uses for such articles.

Composite materials including cementitious articles and those reinforced with fibers are often used as building products. Examples include interior and exterior building panels, siding for external walls of buildings. Many such composite building products are installed manually by construction workers. There is a need for building products to be light in weight, durable, nailable, and easy to work with.

SUMMARY

In one or more embodiments described herein are fiber reinforced cementitious articles having one or more improved properties. The articles are of a formed shape and include one or more shaped regions. The articles have a low density, exhibit good strength and good durability. In one or more embodiments, articles may be initially prepared as long articles useful for building products, such as siding, panel, trim, fascia, roofing, crown moulding, decking, or fencing.

Articles described herein are cementitious and comprise a hydraulic binder, at least one siliceous source, and one or more fiber sources, at least one fiber source useful for reinforcement. Formulations for said articles may further comprise one or more additives, such as one or more plasticizers, density modifiers, rheology modifiers, water repelling or hydrophobic additives, thickeners and/or other additives.

Methods of making said articles include processing by casting, molding, extrusion or flow-on, yielding an article with a finish that may be generally smooth, rough and/or textured. Surfaces may be further finished using methods, such as sanding, brushing, sand-blasting, stamping, embossing, machining and the like.

In one or more embodiments, articles described herein include one or more pre-selected and shaped regions. A shaped region may be a channel that forms an opening that is hollow, inverted and/or protruded. Shaped regions may be formed within the article, such as by forming openings at an end and/or as hollowed regions or cavities within. The openings may or may not span the entirety of the article (e.g., width, length). Inverted and/or protruded regions extend from one or more surfaces of an article described herein. The number, geometry, and location of each pre-selected and shaped region is configured to reduce the mass and/or apparent density of an article described herein. Generally, the mass and/or apparent density is reduced without adversely affecting the stress to density ratio of the article. In some embodiments, the pre-selected regions are configured to provide the article with an even higher stress to density ratio as compared to an equivalent article that does not have the regions described herein. In one or more embodiments, the pre-selected and shaped regions comprise one or more channels extending across the length or width of the article at predetermined intervals. When regions are hollow and within the article, the cross-sectional shape of the region may be selected from a group consisting of square, modified square, polygon, rectangle, modified rectangle, triangle, modified triangle, circle, modified circle, oval, modified oval, trapezoid, modified trapezoid, and combinations thereof.

Various embodiments described herein provide a building article having two elongated opposing sides and a plurality of sidewalls extending therebetween. The building article includes one or more shaped cavities, some of which may be formed within. The number, shape and location of the cavities are configured to provide the article with a stress to apparent density ratio that is higher than, in some embodiments, at least 20% that of an equivalent building article without the shaped regions or higher than about 25% or is higher than about 30% or is higher than about 35% that of an equivalent building article without the shaped cavities. In some embodiments, the shaped regions. In some embodiments, the shaped regions comprise a plurality of elongated channels extending across the length of the article. Channels may be present on the surface or within the article. In some embodiments, the article preferably has a thickness of about ¼ inch or greater and a length of about 6 feet or greater. In some embodiments, the article preferably has a thickness of about ¼ inch or greater and a length of about 8 feet or greater. In some implementations, a surface finish is formed on at least one of the opposing sides of the article. In one embodiment, at least one of the sidewalls of the article has a plurality of openings formed therein. At least one of the openings is adapted to receive an insert configured to fit in the opening, the insert is capable of positioning two adjacent articles side by side. The insert may include a self-locking mechanism that engages with an opening. In certain implementations, the insert has a channel configured to permit air or water to flow.

In further embodiments an article having at least one cavity formed therein is provided. The article optionally includes a further reinforcement embedded near or positioned within the at least one cavity. The further reinforcement is a material selected to provide the article with even better bending or flexural strength as compared to an equivalent article without the further reinforcement. In some embodiments, the further reinforcement is selected from the group consisting of wood, wood composite, plastic or plastic composite (e.g., polypropylene, nylon), glass, polymeric foam, fiber, metal (e.g., aluminum), and combinations thereof. The further reinforcement may be in the form of a mesh, filament, fabric, film and/or foam. In one embodiment, the further reinforcement is a layer having a thickness of at least ¼ inch and embedded in the article. In another embodiment, the further reinforcement includes hollow fibers positioned within the cavity.

In additional embodiments, a system for mounting one or more articles on a building structure is provided. The system includes a first article having an elongated body defined by two opposing sides and a plurality of sidewalls extending therebetween and further comprising more than one pre-selected shaped regions formed therein. The first article is made of a low-density fiber reinforced cementitious material and is nailable. The first article has a stress to apparent density ratio of at least about 8.0 g/cm³ or greater or at least about 9 g/cm³ or greater or at least about 9.25 g/cm³ or greater. The system further comprises at least one second article, each second article having an elongated body and an edge adapted to engage with the first article in a perpendicular manner so as to close a gap. In one embodiment, the first article has a groove formed to receive and engage with the edge of the second article. The pre-selected shaped regions in the first article include one or more hollow channels that form openings at ends of the first article. The openings may extend across the length of the first article. The system optionally further comprises end plugs adapted to extend into the openings of the first article so as to cover its one or more openings. The system optionally further comprises one or more inserts adapted to engage with at least one opening of the first article in a manner so as to join together and secure the first article with another article having openings.

Still further embodiments include a fascia article having an elongated body and a plurality of open channels when formed. The channels span at least a portion of the article and are hollow or grooved regions of a predetermined shape and size and selected to provide the article with a stress to density ratio that is higher than an equivalent article without the open channels. The article is a monolithic material and optionally incorporates a further reinforcement within the article. The first article has a stress to apparent density ratio of at least about 8.0 g/cm$^3$ or greater or at least about 9 g/cm$^3$ or greater or at least about 9.25 g/cm$^3$ or greater. In certain embodiments, the channels extend across the full length of the article. Each channel has a cross-sectional shape selected from the group generally consisting of a square, rectangle, triangle, circle, oval, trapezoid, polygon, and combinations thereof. Channels are not necessarily uniform in size, spacing and/or shape.

Yet additional embodiments described herein include methods of installing an article to a building structure, wherein the article is nailable and has a plurality of channels when formed. One representative method includes positioning the article adjacent one or more mounting surfaces (e.g., roof joist) of the building structure in a manner such that the length of the article extends across the mounting surface, and nailing the article at locations so as to mount the article to the building structure. One or more methods may further comprise mounting a second article to the building structure and adjacent the first article, interconnecting the two articles in a manner such that the two articles are joined end to end. Interconnecting the two articles includes inserting a first end of a connector partially into a channel positioned on one end of the first article and inserting a second end of the connector partially into a channel positioned on one end of the second article.

Still additional embodiments include methods of making an article described herein. One representative method includes mixing ingredients useful to form a monolithic fiber cement article into a paste, processing in an extruder, profiling channels during extrusion using a structure and a die to form more than one channel, thereby forming a green shaped article with more than one channel, and curing the green shaped article. One or more methods may further include providing additional channels after forming the green shaped article. One or more methods may further include adding a surface finish (e.g., sanding, machining, brushing, as examples) to the green shaped article. One or more methods may further include coating the article after curing.

Other embodiments described herein include systems for using the one or more articles. One representative system comprises an article formed from a low density fiber cement monolithic material that allows the article to be directly nailed to a building structure and also comprises a soffit that can be integrally positioned with the article and in a manner so as to close a gap between the article and the building structure. The article includes more than one hollow regions formed therein and is configured to provide the article with a stress to density ratio that is higher than an equivalent article made without the hollow regions.

Those skilled in the art will further appreciate the above-noted features and enhancements together with other important aspects thereof upon reading the detailed description that follows in conjunction with the drawings.

BRIEF DESCRIPTION OF THE DRAWINGS

For more complete understanding of the features and advantages of the invention herein, reference is now made to a description of the invention along with accompanying figures, wherein:

FIGS. 7-11 and 14 depict further representative configurations of articles described herein, each showing an end view;

FIG. 12A depicts a further representative configuration of an article described herein, shown in perspective view;

FIG. 12B depicts an end view the configuration of FIG. 12A showing shaped regions;

FIG. 12C depicts an end view a configuration similar to that of FIG. 12A showing shaped regions;

FIG. 13A depicts another representative configuration of an article described herein, shown in perspective view;

FIG. 13B depicts an end view the configuration of FIG. 13A showing shaped regions;

FIG. 13C depicts an end view a configuration similar to that of FIG. 13A showing shaped regions;

FIG. 15 depicts a still further representative configuration of an article described herein, shown in perspective view;

FIGS. 16A, 16B, 17A and 17B depict still further representative configurations of articles described herein, each showing an end view with inserts (shown in cross section) positioned within internal shaped regions;

FIGS. 22 and 23 depict representative articles described herein having one or more further reinforcements therein;

FIG. 30 depicts a representative method for making an article described herein;

FIGS. 31-34 depict additional representative configurations of articles described herein, shown in perspective view (31A, 32A, 33A, 34A) and end view (31B, 32B, 33B, 34B); and FIGS. 35-39 depict various representative embodiments of articles described herein when in use.

DETAILED DESCRIPTION

Figure 1A:
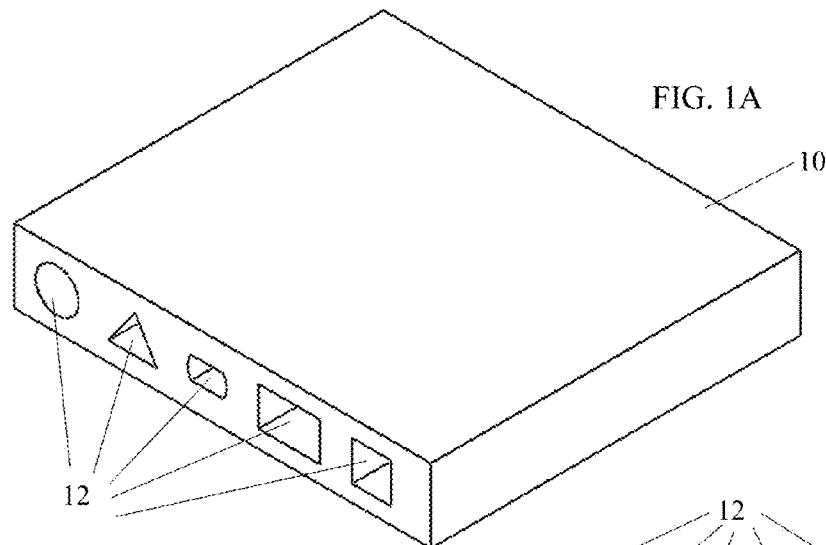
FIG. 1A depicts a representative configuration of an article described herein, shown in perspective view.

Although making and using various embodiments are discussed in detail below, it should be appreciated that as described herein are provided many inventive concepts that may be embodied in a variety of contexts. Embodiments discussed herein are merely illustrative of ways to make and use the invention, and do not limit the scope of the invention.

The drawing figures are not necessarily to scale and certain features may be shown exaggerated in scale or in somewhat generalized or schematic form in the interest of clarity and conciseness.

In the U.S. and other countries many building products are made of vinyl or wood. Wood or vinyl are often used as a finished product or as a subsurface material under aluminum. While wood is lightweight, it tends to fade and crack from weather and will require repainting or replacement periodically, typically in about a three to five year time frame, depending on the location and environmental conditions. Building products, such as boards, made out of wood often do not have a uniform appearance due to the natural composition of wood. Thus, what is needed is a lightweight article that is as or more durable than wood and is resistant to fading or cracking from weather and/or has a more uniform appearance. While cementitious building products have been developed and are durable and a long lasting alternative to wood products, some conventional cement-based products may be difficult to nail because of the thickness of the board, which may be coupled with the nature of cement. Moreover, cementitious building boards may be heavy, dense and difficult to handle. Thus, what is needed are alternative light-weight and low-density cementitious building articles that are also durable, long lasting and easy to handle.

One or more embodiments described herein provide cementitious articles reinforced with one or more fiber types, also referred to herein as fiber cement articles. Articles described herein may take on one or more configurations. As a panel or sheet, an article is generally defined by at least two generally planar faces, which are exterior surfaces and are generally opposing surfaces. An article herein generally also has one or more perimeter edges, generally defined as an exterior surface having a surface area less than that of the smallest face or less than that of the smallest edge. When an article has a width that is less than its length, the length defines two ends of the article. Other shaped articles may have more than two ends. Representative configurations for articles described herein include panel, fencing, siding, trim, fascia board, roofing tile, crown moulding, decking, and the like. Articles described herein may be used for exterior and for interior applications.

The matrix structure of articles described herein include micro and macro voids. Micro voids generally refer to voids below about 100 micrometer (μm), while macro voids are generally larger. Macro and micro voids may be uniformly distributed or may be randomly distributed throughout the matrix of articles described herein. In one or more embodiments, the voids are gas pockets distributed throughout the matrix. Gas pockets may be generally spherical or of alternative shapes, each pocket or space having a nominal size of generally less than about 1 millimeter (mm). In some embodiments, the size of the gas pocket is less than about 500 μm. In some embodiments, the size of the gas pocket is less than about 100 μm. In some embodiments, the size of the gas pocket is less than about 50 μm. Gas pockets referred to herein are not voids inherent with certain raw material sources. For example, a gas pocket does not generally refer to an inherent space or void that may occur within the structure of a hollow microsphere or hollow perlite, or other material that has void or material-free space naturally occurring in the material, itself. The term gas, as described herein, may refer to atmospheric air or to an inert or reactive gas, such as pure nitrogen, or carbon dioxide, as examples. Articles as described herein having one or more gas pockets in their matrices will generally exhibit a lower apparent density than an article without gas pockets.

Fiber cement articles described herein generally have an apparent density of less than about 1.2 g/cm$^3$, sometimes less than about 1.0 g/cm$^3$. In some embodiments, the apparent density is less than about 0.95 g/cm$^3$, and maybe less than about 0.90 g/cm$^3$, and maybe less than about 0.85 g/cm$^3$, and maybe less than about 0.80 g/cm$^3$, and maybe less than about 0.75 g/cm$^3$, and maybe less than about 0.70 g/cm$^3$, or less than about 0.65 g/cm$^3$ and may be less than about 0.6 g/cm$^3$. The apparent density, as referred to herein, is the dry weight of the article (mass) divided by the volume of the article as defined by its exterior flat surfaces. Fiber cement articles with a low apparent density as described herein have been found to be particularly useful as building products, as reflected by their light weight, ease of handling and reduced structural support requirements as compared with higher apparent density articles. By having a low apparent density, the one or more articles described herein may in one or more forms be made very long and light weight without being too heavy, dense or difficult to handle during installation. In one example, an article formed as fascia has an apparent density of at or about 0.8 g/cm$^3$. In an additional example, an article formed as fascia has an apparent density of at or about 0.85 g/cm$^3$. In a still further example, an article formed as a trim has an apparent density of at or about 0.9 g/cm$^3$.

The thickness of articles described herein, measured as the shortest distance between two (generally planar) surfaces, may be about 3 inches or less. In some embodiments, the thickness may be about 2 inches or less, or may be about 1.5 inches or less. In some embodiments, the thickness is about 1 inch or less or is about ¼ inch. Such articles when formed as thinner building products (e.g., panel or siding having a thickness of about 2 inches or less or about 1.5 inches or less or about 1 inch or less) allow for the same area of coverage when in use yet having a reduced amount of raw materials for forming the article. In some embodiments, the thickness may vary across the article in view of various protrusions, inflections and/or hollowed and/or grooved regions provided with the formed article as will be described further. In a first example, an article in the form of a trim has a thickness of about 1 inch. In another example, an article in the form of a trim has a thickness of about 1.5 inches. In yet another example, an article in the form of a fascia has a thickness of about 1 inch. In yet another example, an article in the form of a fascia has a thickness of about 1.5 inches. In still another example, an article, made in the form of crown moulding has at it thicker point a thickness of about 0.78 inches or a thickness of about 0.83 inches.

When an article described herein is configured as a longer article, such as a sheet or panel or trim or fascia or crown moulding, as examples, the length of the panel is the longest distance between two points on the same surface when considering all exterior surfaces. Often, articles described herein have a length greater than about 8 feet, or may be at or greater than about 10 feet, or may be at or greater than about 12 feet or may be at or greater than about 16 feet. It has been found that in some instances, a long building product, such as for trim, decking or fascia, may allow for quicker installation and will have fewer joints between consecutive pieces, which aids in the ease and time of installation. In one example, an article in the form of trim has a length of 10 feet, or has a length of 12 feet or has a length of 16 feet. In another example, an article in the form of a fascia has a length of 10 feet, or has a length of 12 feet or has a length of 16 feet.

In one or more embodiments, articles described are configured as long and somewhat more narrow sheets or panels or trim or fascia or crown moulding, as examples. The width of an article, measured as a distance between two edges, is in some embodiments at or less than about 16 inches. The width may also be at or less than about 12 inches or may be at or less than about 8 inches or at or less than about 6 inches or at or less than about 5 inches. In further embodiments, the width is at or less than about 4 inches. It has been found that when some articles are narrow, they may be particularly suitable for use as trim or as fascia boards. In one example, an article in the form of trim has a width of 11.25 inches, or has a width of 7.25 inches, or has a width of 5.5 inches, or has a width of 4.5 inches, or has a width of 3.5 inches. In another example, an article in the form of fascia has a width of 7.25 inches, or has a width of 5.5 inches. Advantageously, with mass reduction and strength improvements as described herein, longer products, may be made as described herein. In addition, such products, whether longer in length or not, have been found to exhibit reduced breakage during handling and transit as compared with solid articles (e.g., lacking one or more shaped channels). Formed products described herein are found to meet the standard dimensions and requirements for certain building products, such as fascia, trim and crown moulding, as examples.

In one or more articles described herein, exterior surfaces may be substantially flat having a generally smooth finish and/or a generally rough finish. In addition or as an alternative, at least one exterior surface may be substantially shaped with or without an additional finish. In some embodiments, the finish on one or more surfaces may include an artistic design, such as a name and/or a specific marking that is uniform or random. In some embodiments, a surface may imitate a known texture, such as wood grain or stone appearance.

Articles when prepared as described herein may include one or more shaped regions or channels. In some embodiments, a shaped channel is an external hollowed region and/or grooved region. In addition or as an alternative, a shaped channel may be an internal hollow region. A hollow section or region reduces the weight of articles described herein. Hollow sections as described herein may be pre-formed (e.g., prepared during the formation process). One or more hollowed sections may be engineered in an article by designing one or more shapes within the article that are absent any cementitious or other material. The one or more shaped regions are engineered to allow mechanical forces on the article to be more readily dispersed and distributed along the article, thus minimizing localized stress concentrations, which ensures strength integrity of the entire article. The one or more pre-formed hollow regions generally comprise one or more elongated channels, the channels may extend or span a portion or the full length or width of the article. When more than one hollowed region is provided in an article, the shape of each region may be the same, may be similar or may be different. The one or more pre-formed hollow regions in a single article do not need to be the same in order to offer the minimization of localized stress concentrations and/or the reduction in density.

In addition or as an alternative, one or more surfaces of an article described herein may have one or more additional shaped channels having portions that protrude outward and/or inflect inward. The protruded or inflected channels may include a functional portion or may serve as a design feature, or combinations thereof. Examples of such shaped surfaces are a key line, a bead, and a groove. Inflected or protruded portions may be deep or may be only superficial. Some articles may include a combination of shaped regions. For example, inflected and/or protruded portions may be further combined with one or more internal hollowed regions. As with hollowed portions, the outward and inflected portions of an article as described herein may further reduce the weight of articles described herein. An outward and/or inflected portion of an article is often pre-formed (e.g., prepared during the formation process). One or more inflected and/or protruded portions are often engineered in an article by designing one or more of such portions on at least one surface of an article. An inflected portion generally includes a region that is absent any cementitious or other material. The protruded portion generally comprises in whole or in part a cementitious material. Either a protruded or inflected portion may further be combined with an internal hollowed region. The one or more shaped regions that are inflected or protruded are often engineered to allow mechanical forces on the article to be more readily dispersed and distributed along the article, thus minimizing localized stress concentrations and ensuring strength integrity for the entire article. In some embodiments, the number, shape and location of each inflected and/or protruded region may be selected to provide an article described herein with a stress to apparent density ratio that is about 10% or higher than that found in a conventional constructed article of similar dimensions without shaped regions described herein. In some embodiments, the number, shape and location of each inflected and/or protruded region may be selected to provide an article described herein with a stress to apparent density ratio that is about 15% or higher than that found in a conventional constructed article of similar dimensions without shaped regions described herein. In additional embodiments is provided an article with a stress to apparent density ratio that is at least 20% higher than that found in a conventional fascia constructed without shaped regions described herein. In further embodiments is provided an article with a stress to apparent density ratio that is at least 25% higher than that found in a conventional fascia constructed without shaped regions described herein. In further embodiments is provided an article with a stress to apparent density ratio that is at least 30% higher than that found in a conventional fascia constructed without shaped regions described herein.

Shaped regions described herein may be configured to reduce the mass and apparent dry density of the article without substantially affecting its stress to density ratio. In some implementations, the number, configuration, and arrangement of the shaped regions are selected to actually improve the stress to apparent density ratio of the final article while reducing its mass. In other implementations, the shaped regions are configured to reduce the mass of the article and at the same time increase the modulus of rupture (MOR) and modulus of elasticity (MOE) of the article.

As described above, the stress to density ratio of an article described herein having more than one channel and/or more than one hollow region may be substantially the same as or may be higher than a solid article of the same external dimensions (one that does not have the channels or hollow regions). In one or more embodiments, the stress to apparent density ratio of an article described herein is greater than 8 MPa/(g/cm$^3$)$^3$. In some embodiments, the stress to apparent density ratio is at or about 11.79 MPa/(g/cm$^3$)$^3$ or higher. In some embodiments, the stress to apparent density ratio is at or greater than about 12 MPa/(g/cm$^3$)$^3$. Properties, such as the stress to density ratio are important in many building articles because many articles, such as those shaped as panels and boards, provide some structural self support when mounted on a building. As such, hollow regions when not positioned properly could potentially and adversely impact the stress to density ratio and other properties of the article. Articles described herein generally have a higher apparent stress to density ratio compared to conventional fiber reinforced cementitious building products (lacking shaped regions described herein). In some embodiments, the ratio of saturated MOR value (in MPa) to cubic of oven-dry density (density to the power of 3) (in g/cm$^3$) is greater than about 7 MPa/(g/cm$^3$)$^3$. In some embodiment, this value is greater than about 7.5 MPa/(g/cm$^3$)$^3$, or greater than about 8 MPa/(g/cm$^3$)$^3$. In some embodiments, the MOR to cubic of density ratio is greater than about 9 MPa/(g/cm$^3$)$^3$, or is greater than about 10 MPa/(g/cm$^3$)$^3$, or is greater than about 11 MPa/(g/cm$^3$)$^3$, or is greater than about 12 MPa/(g/cm$^3$)$^3$. The oven-dry density is measured in accordance with ASTM C567 and C1185. MOR measurements are based on ASTM C1185, which requires a minimum test span of 18 inches for an article having a thickness of 1 inch.

In one or more embodiment, the hollow regions together comprise less than about 30% of the apparent volume of the article, or may comprise about 28.3% of the apparent volume of the article or may comprise at or less than about 25% of the apparent volume.

Some representative and suitable configurations for articles described herein are depicted in FIGS. 1-18 and 21-24. The figures show one or more articles having one or more shaped portions, the shaped portions inflect inward, protrude outward and/or include internal hollowed portions or cavities in the article. In many embodiments, the shaped regions span the entire article along its width and/or length. When there is more than one inflected, protruded and/or hollowed region, said regions may have the same shape or may have different shapes, as further shown and as described below.

Figure 1B:
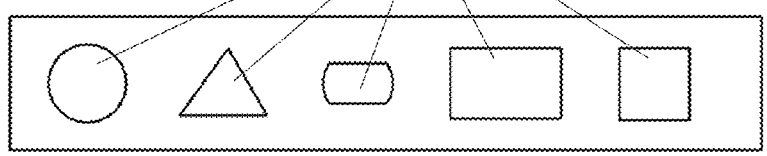
FIG. 1B depicts an end view the configuration of FIG. 1A showing shaped regions.

FIG. 1 is a representative schematic in perspective view (1A) and end view (1B) of a representative article 10 when formed having more than one channel 12 as hollowed regions that each span the length of the article. The figure shows each hollowed region to be of a different shape. Representative shapes include a circle, triangle, oval, square or other polygon, some of which are depicted in the figures. In the figure, the hollowed regions are generally each about equidistant apart and the each of the outermost shaped regions are each about the same distance from a side edge. In some embodiments, the channels may span the entire length of the article. In other embodiments, the channels only span a portion of the article, generally forming openings at least on one end of the article. In some embodiments, the channels provide openings on both ends of the article. In alternative embodiments, channel may not have the same shape and may be in a continuous or discontinuous pattern.

Figure 2A:
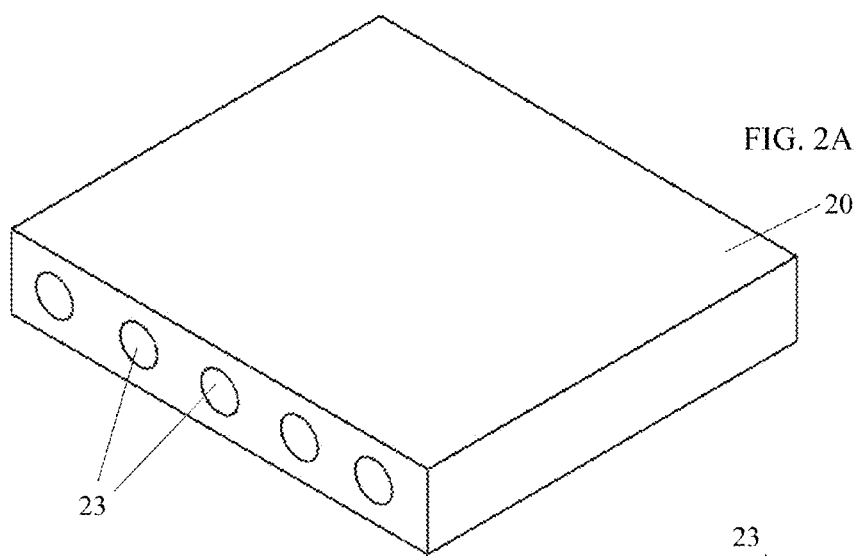
FIG. 2A depicts another representative configuration of an article described herein, shown in perspective view.
Figure 2B:
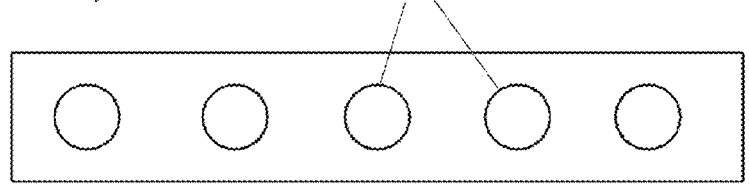
FIG. 2B depicts an end view the configuration of FIG. 2A showing shaped regions.

FIG. 2 is a representative schematic in perspective view (2A) and end view (2B) of a formed article 20 having more than one hollowed region 23, each hollowed region having the same general shape. In alternative embodiments, channel may not have the same shape and may be in a continuous or discontinuous pattern. In some embodiments, the channels may span the entire length of the article. In other embodiments, the channels only span a portion of the article, generally forming openings at least on one end of the article. In some embodiments, the channels provide openings on both ends of the article.

Figure 3A:
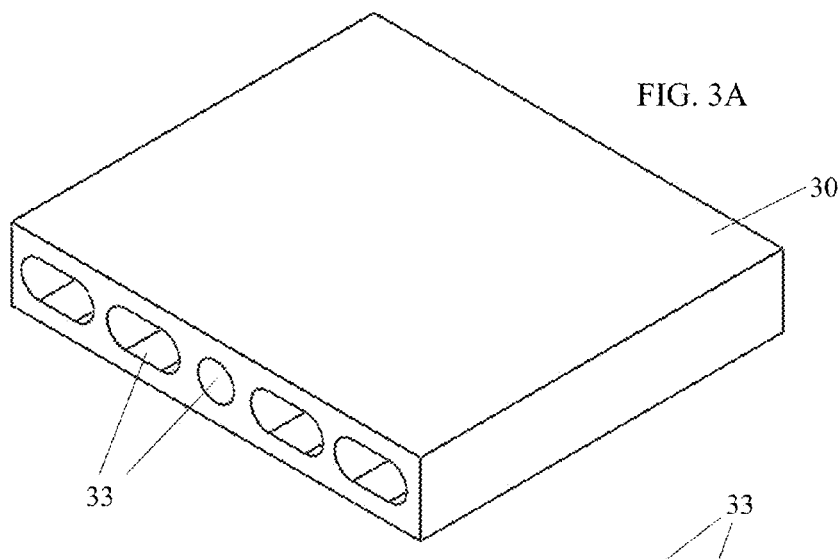
FIG. 3A depicts another representative configuration of an article described herein, shown in perspective view.
Figure 3B:
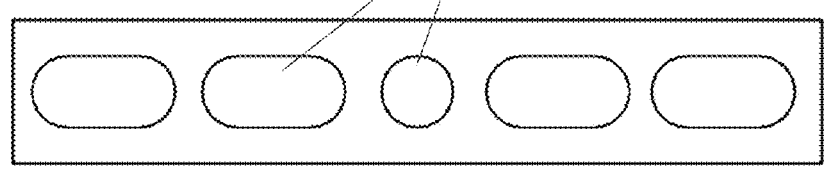
FIG. 3B depicts an end view the configuration of FIG. 3A showing shaped regions.

FIG. 3 is a representative schematic in perspective view (3A) and end view (3B) of a formed article 30 having more than one hollowed region 33. The hollowed regions shown include outermost shaped regions having a first shape and a central hollowed region with a second shape.

Figure 4A:
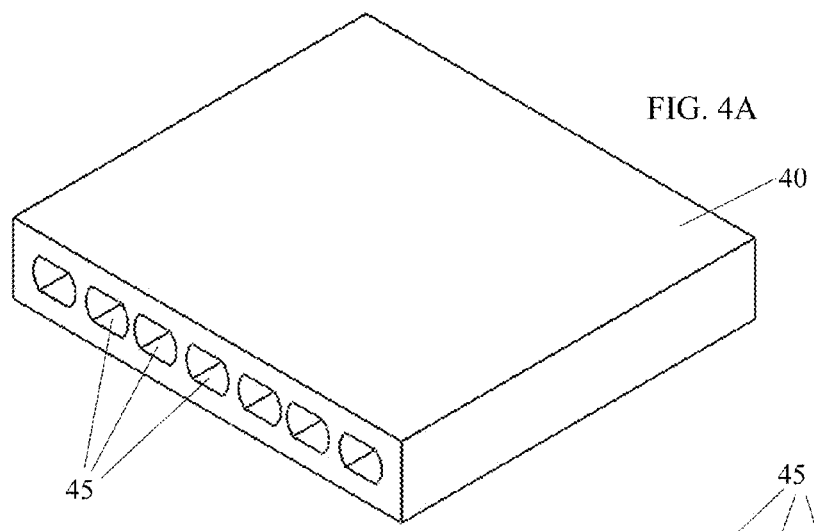
FIG. 4A depicts another representative configuration of an article described herein, shown in perspective view.
Figure 4B:
FIG. 4B depicts an end view the configuration of FIG. 4A showing shaped regions.

FIG. 4 is a representative schematic in perspective view (4A) and end view (4B) of a formed article 40 having more than one hollowed region 45, each hollowed region having the same general shape. There are more hollowed portions in FIG. 4 than in FIG. 2 or 3. The width and/or thickness of the formed article of FIG. 4 may be the same as or more than or less than that of either FIG. 2 or 3.

Figure 5A:
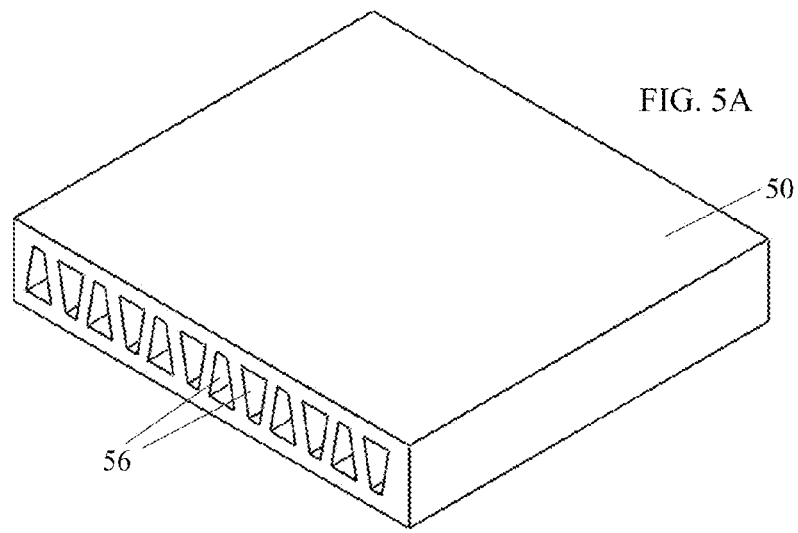
FIG. 5A depicts another representative configuration of an article described herein, shown in perspective view.
Figure 5B:
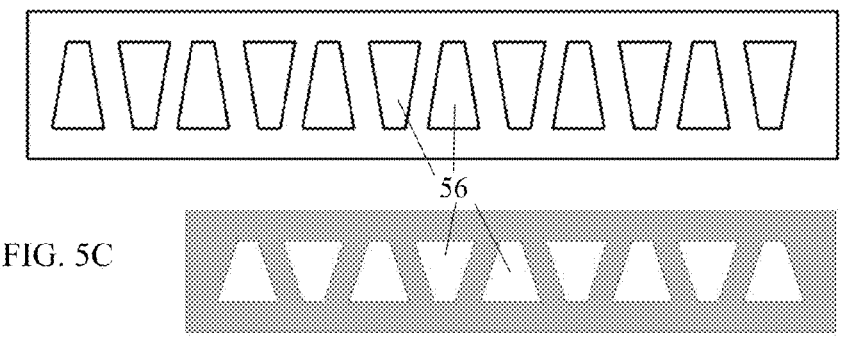
FIG. 5B depicts an end view the configuration of FIG. 5A showing shaped regions.

FIGS. 5A and 5B are a representative schematic in perspective view (5A) and end view (5B) of a formed article 50 having more than one hollowed region 56. The hollowed regions form a general pattern in which every other hollowed portion is of a first shape and the neighboring hollowed portions are of a second shape, thus forming an apparent pattern. There are more hollowed portions in FIG. 5 than in FIG. 2 or FIG. 3 or FIG. 4. The width and/or thickness of the formed article of FIG. 5 may be the same as or different from that of FIG. 2, 3 or 4.

Figure 5C:
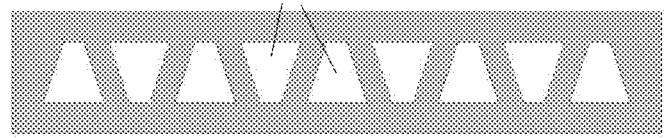
FIG. 5C illustrates a further representative configuration of an end view of a formed article describe herein.

FIG. 5C is a representative schematic of an end view of a formed article 50 having fewer hollowed regions 56 than shown in FIG. 5A or 5B. The width and/or thickness of the formed article of FIG. 5C may be the same as or different from that of FIG. 5A or 5B.

FIG. 6 is a representative schematic in perspective view (6A) and end view (6B) of a formed article 60 having more than one hollowed region 64, each hollowed region having the same general shape. There are less hollowed portions in FIG. 6 than in FIG. 2, 3, 4 or 5. The width and/or thickness of the formed article of FIG. 6 may be the same as or different from that of FIG. 2, 3, 4 or 5.

Figure 6A:
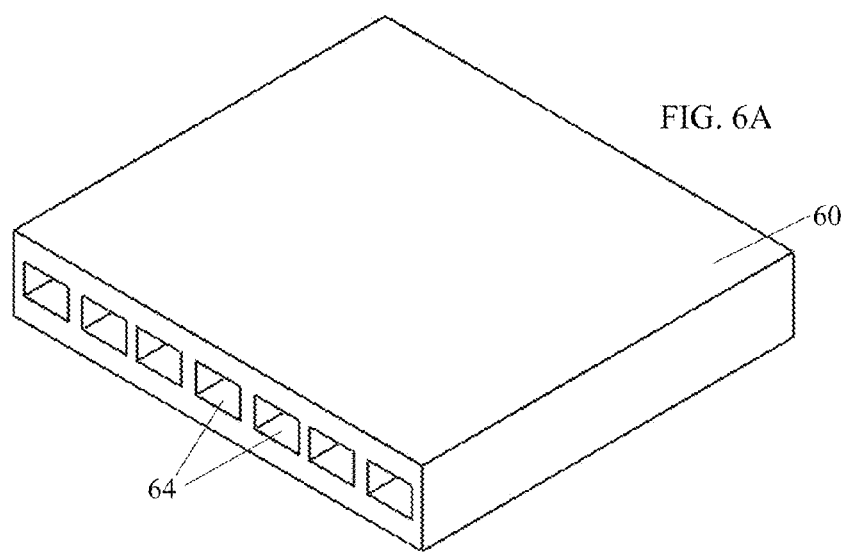
FIG. 6A depicts another representative configuration of an article described herein, shown in perspective view.
Figure 6B:
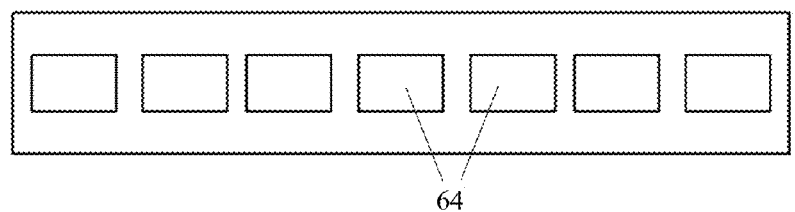
FIG. 6B depicts an end view the configuration of FIG. 6A showing shaped regions.
Figure 6C:
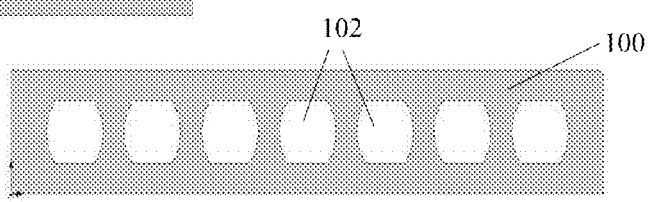
FIG. 6C illustrates a still further representative configuration of an end view of a formed article describe herein.

FIG. 6C is a representative schematic of an end view of a formed article 60 having fewer hollowed regions 64 than shown in FIG. 6A or 6B. The width and/or thickness of the formed article of FIG. 6C may be the same as or different from that of FIG. 6A or 6B.

Figure 7:
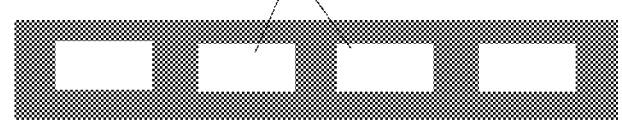

FIG. 7 is a representative schematic of an end view of a formed article 70 having more than one hollowed region 72. The hollowed regions in the figure are shown as equally spaced apart. Such equal spacing is not necessarily essential.

Figure 8:
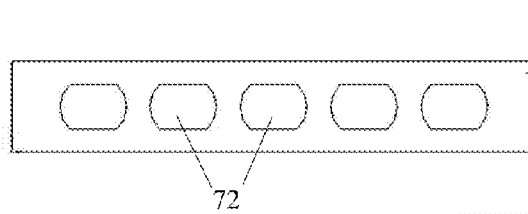

FIG. 8 is a representative schematic of an end edge view of a formed article 80 having more than one hollowed region 82. The hollowed regions form what appears to be a pattern and includes a first shaped region 82 and second shaped region 84, in which a first shape is positioned after a second shape, and such an apparent pattern is repeated.

Figure 9:
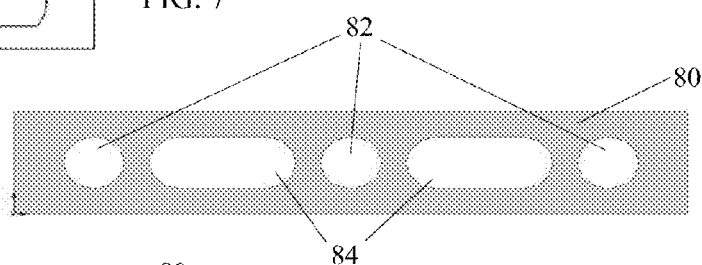

FIG. 9 is a representative schematic of an end view of a formed article 90 having more than one hollowed region 94. The hollowed regions include outermost hollowed regions having a first shape and a central hollowed region with a second and different shape.

Figure 10:
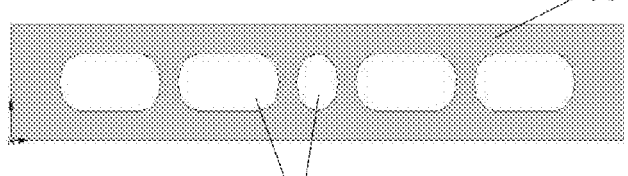

FIG. 10 is a representative schematic of an end view of a formed article 100 having more than one hollowed region 102. Each hollowed region has the same general shape and is generally equally spaced apart from each other. There are more hollowed portions in FIG. 10 than in FIG. 7. The width and/or thickness of the formed article of FIG. 10 may be the same as or different from that of FIG. 7.

Figure 11:
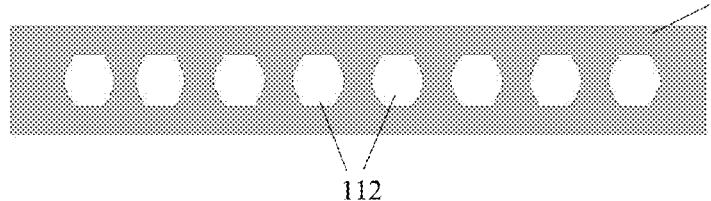

FIG. 11 is a representative schematic of an end view of a formed article 110 having more than one hollowed region 112. Each hollowed region has the same general shape and is generally equally spaced apart. There are more hollowed portions in FIG. 11 than in FIG. 4. The width and/or thickness of the formed article of FIG. 11 may be the same as or different from that of FIG. 4.

FIG. 12 is a representative schematic in perspective view (12A) and end view (12B) of a formed article 120 having more than one shaped channel, that includes more than one inflected regions (e.g., 122 and 123) and more than one protruded regions (e.g., 124, 126 and 128). In this embodiment, some shaped channels are similar while others vary in shape and size. FIG. 12C is another representative schematic of a formed article showing an end view, in which the configuration is similar to that of FIGS. 12A and 12B.

FIG. 13 is a representative schematic in perspective view (13A) and end view (13B) of a formed article 130 having more than one shaped channel, that includes more than one inflected region (e.g., 134 and 136) and more than one protruded region (e.g., 132 and 138). In addition, FIG. 13 has more than one shaped channel, each forming a hollowed region (e.g., 131 and 133). Some hollowed regions of FIG. 13 have a similar general shape. FIG. 13C is another representative schematic of a formed article showing an end view, in which the configuration is similar to that of FIGS. 13A and 13B. In FIG. 13C, each hollowed region has generally a similar shape.

FIG. 14 is a representative schematic of an end view of a formed article 140 having more than one shaped channel, that includes more than one inflected region (e.g., 144) and more than one protruded region (e.g., 145, 146, 147). FIG. 14 also has shaped channels comprising more than one internal hollowed region (e.g., 142, 143 and 148). In this embodiment, the hollowed channels vary in shape and size. The protruded regions and inverted channels also differ in shape and size.

FIG. 15 is a representative schematic of an article 150 in perspective view having more than one shaped channel (e.g., 152, 153, 155). In this embodiment, one of the channels is formed from protruded region 154.

FIGS. 16A and 16B are representative schematics of an end view of formed articles 160 having more than one opening 162 on an end. Each opening includes an insert 164, shown in cross section, that is configured to fit within the opening. The inserts may be positioned at least on one end of a formed article described herein. In both FIGS. 16A and 16B, each insert is shown to have the same general shape in its cross sectional view. In additional embodiments, some inserts may include a different cross-sectional shape. Moreover, in some embodiments, not all openings will always require or include an insert.

FIGS. 17A and 17B each show a representative schematic of an end view of a formed articles 170 having more than one opening 172 on an end. Each opening includes a shaped insert 174, shown in cross section, that fits within the opening. Each insert when positioned will be at least on one end of a formed article. In both FIGS. 17A and 17B, each insert is shown to have the same general shape. In additional embodiments, some inserts may include a different shape. Not all openings will require or necessarily include an insert.

Figure 18:
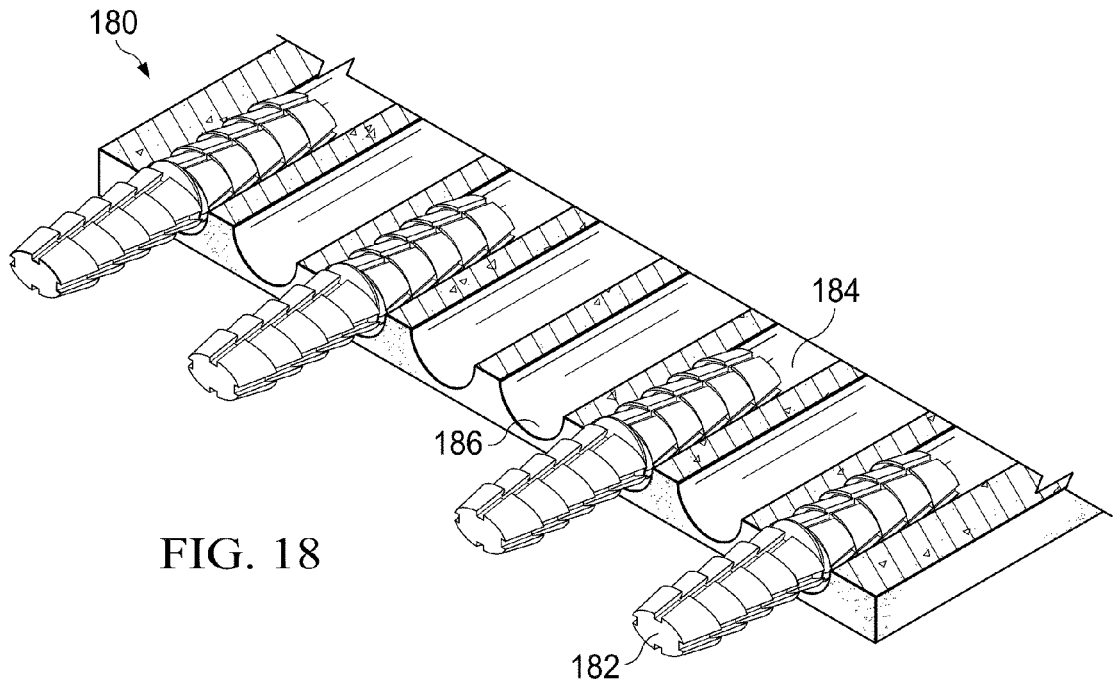
FIG. 18 depicts a representative article described herein with inserts, showing a portion of one end of the article when cut.
Figure 19A:
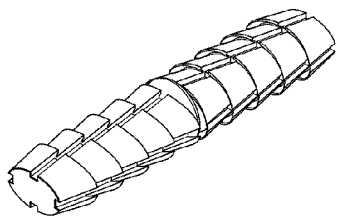
FIGS. 19A, 19B, 19C and 20 depict representative inserts described herein.
Figure 19B:
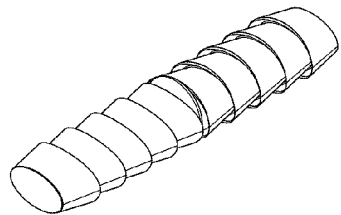
Figure 19C:
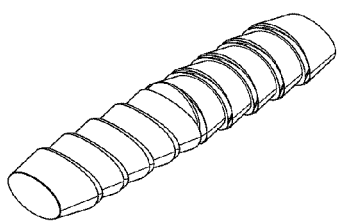
Figure 20:
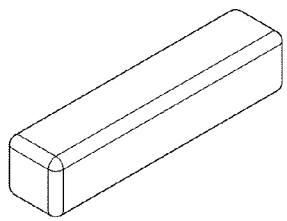
Figure 21A:
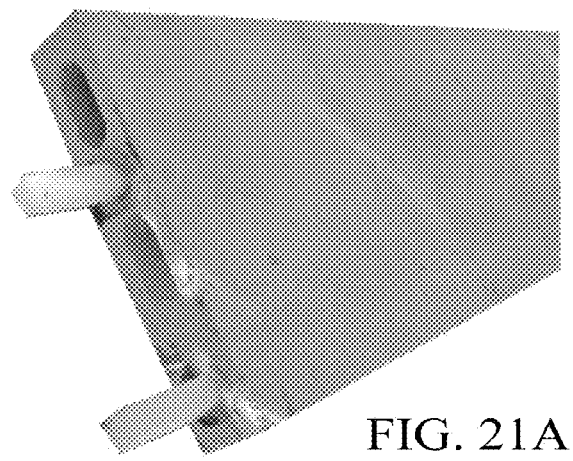
FIGS. 21A and 21B depict additional representative articles described herein with inserts, showing one end of one or more articles and openings therein.
Figure 21B:
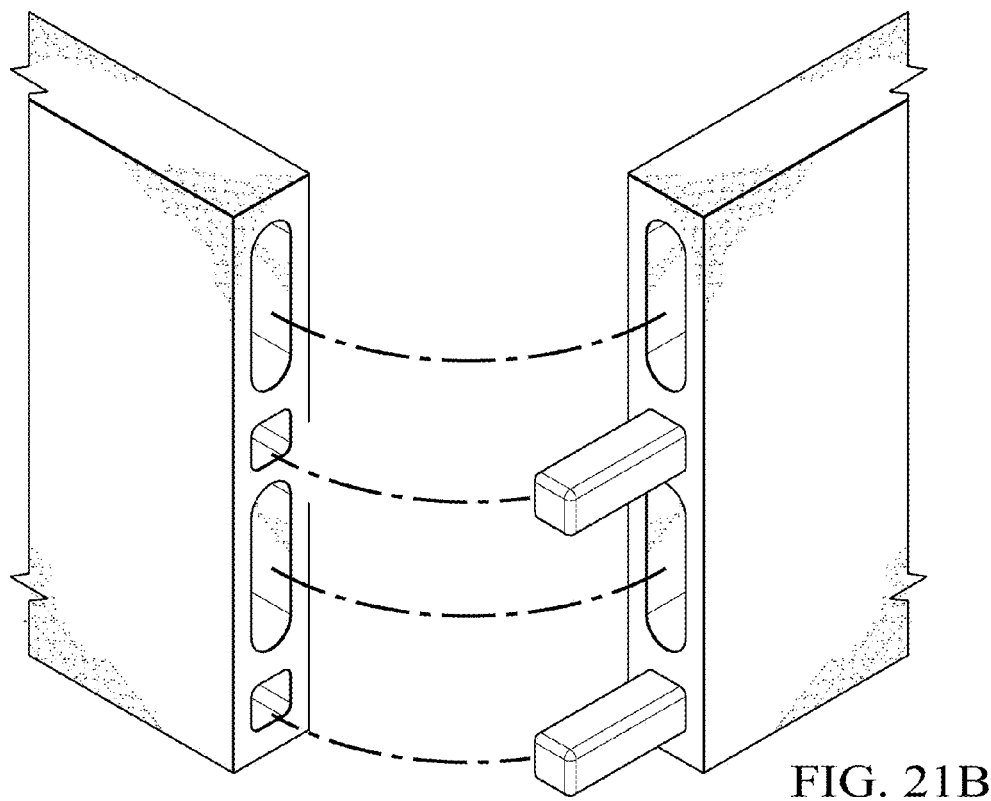

FIG. 18 shows only a portion of one end of an article 180 when cut along its width. The view depicts more than one insert 182. Each insert has the same general shape and is positioned in a hollowed portion 184 of article 180. Each hollowed portion in the figure has the same general shape. Hollowed portions 186 do not include an insert. In additional embodiments, some hollowed regions may be of a different shape and/or fewer or more hollowed regions may include an insert.

The article when prepared has a monolithic structure, whereby the article is not structured or formed by a layering of one or more stratum, sheets or layers.

Articles described herein generally have a modulus of rupture (MOR) at saturation greater than about 4 MPa. In some embodiments, the saturated MOR values of the article is greater than about 7 MPa or greater than about 8 MPa. In some embodiments, the saturated MOR value of the article is greater than about 10 MPa. For example, an article formed as fascia may have an MOR at ambient temperature of about 6 to 9 MPa. At saturation, the formed fascia article will have an MOR of about 6.2 to about 9.9 MPa or, in some embodiments, greater than 9.9. In another example, an article formed as fascia may have an MOR at ambient temperature of about 7.6 to about 8.7 MPa. In a further example, an MOR for a similarly-shaped article may be higher at or greater than 8.7 MPa.

A modulus of elasticity (MOE) on articles described herein is generally less than about 7 GPa, often less than about 6.5 GPa. In some embodiments, the MOE is less than about 6 GPa, or less than about 4 GPa or less than about 3.5 GPa. In one example, an article formed as fascia may have a saturated MOE of about 3.2 to about 4.7 GPa. In a further example, an MOE for a similarly-shaped article may be higher than 4.7 GPa.

In many embodiments, an article when prepared has an apparent density of about 0.77, which results in an article having a saturated MOR value of about 9.1 MPa and saturated MOE value of about 5.7 GPa. In another embodiment, an article has a saturated MOR value of about 6.5 MPa and saturated MOE value of about 5.4 GPa. Still further examples are provided in TABLE 2.

The performance parameters of the novel articles, such as MOR, MOE, are characterized by ASTM C1185 or a modified version thereof.

Ease of handling of articles described herein is improved by using shaped profiles as described above and/or by adding at least one further reinforcement in the article. Suitable further reinforcements may be in the form of a mesh, filament, fabric, film, and foam. Examples of materials used for further reinforcement include but are not limited to a wood, wood composite, plastic or plastic composite (e.g., polypropylene, nylon), glass, polymeric foam, fiber, metal (e.g., aluminum), and combinations thereof. In one embodiment, the further reinforcement is a mesh or fabric that can be woven or nonwoven, but preferably has regular polygonal or circular openings. The further reinforcement may also comprise hollow fibers. In some embodiments, the further reinforcement has an elongation of no more than 20% at breaking. In another embodiment, the further reinforcement comprises a reinforcement layer having a thickness of at least ¼ inch. When selected, the further reinforcement material may include properties, such as high alkaline resistance, high UV resistance, long term durability, fire resistance, and should have a predetermined tensile strength. In one or more implementations, the use of a further reinforcement in articles described herein allows for the fabrication of an even longer article, avoiding breakage during the course of shipping and installation.

In making an article with further reinforcement, the article may include a further reinforcement material embedded in the article. The further reinforcement material when embedded may span the full length of the article. The further reinforcement material, when embedded, may be embedded at any depth within the article and is generally not visible from the surface of the article. In addition or as an alternative, an article may include one or more cavities formed therein and a further reinforcement material positioned in the cavity. The further reinforcement material is selected to provide the article with an even higher bending strength as compared to an equivalent article without the further reinforcement. The further reinforcement is often provided in an article having a length at or greater than about 8 feet or at or greater than about 8 feet or at or greater than about 12 feet and a thickness of about ¾ inch or greater or a thickness of about 1 inch or greater.

FIG. 22 illustrates in schematic form an article 220 having a plurality of cavities 222 for positioning a further reinforcement material. The cavities may span the full length of the article. In one embodiment, the further reinforcement material is in the form of reinforcing continuous fibers. Additional further reinforcement materials may also be present in a cavity. In addition or as an alternative, in some embodiments, each cavity may have the same or different further reinforcement material. In FIG. 22, article 220 is shown having a number of channels 224 as internal hollowed regions that are generally of the same shape and are generally equidistant from each other. In other embodiments, hollowed regions do not need to be the same shape or size. In this embodiment, a cavity 222, having a further reinforcement material within it, is positioned near a hollowed region. Cavities 222 are, in this embodiment, shown as equidistant from each other, from a hollowed region, and from a side edge of the article. Other configurations may be made, as desired.

FIG. 23 illustrates in schematic form an article 230 having a further reinforcement material 234 within the article. The further reinforcement is embedded in the article. The further reinforcement is shown to be a particular depth from the upper surface of the article, but in practice may be embedded at any depth. Generally the further reinforcement when embedded will not interfere with shaped regions positioned in or on the article. In one embodiment, the further reinforcement is a metal mesh. In FIG. 23, article 230 further includes a number of hollowed regions 232 that are generally of the same shape and are shown to be equidistant from each other; the further reinforcement is shown to be positioned an equal distance from each hollowed regions. Additional configurations may be prepared, as desired.

In practice, one article having one or more shaped regions therein may cooperate with a second article having one or more shaped regions therein. In one form, cooperation arises when two articles work together. Cooperation may arise when two articles directly adjacent each other are aligned and/or joined. Cooperation may be assisted with the use of one or more inserts. An insert is adapted to engage with an openings formed in a sidewall of an article described herein. Generally one end of an insert is positioned within an opening, generally in the form of a hollow region, on a first end of a first article. The other end of the insert is positioned within an opening (generally in the form of a hollow region) on an adjacent and second article in at least one end. When end openings of two formed articles align, such as via an insert, the two articles are joined together. Thus, an end opening of an article is often adapted to receive an insert to allow cooperation with a second article. In this instance, an insert acts to secure two adjacent articles. When desired, an insert allows a seamless appearance between more than one article when positioned adjacent another in the field (e.g., on a building). One or more forms of an insert may also act to close one or more end openings on an article.

Figure 24:
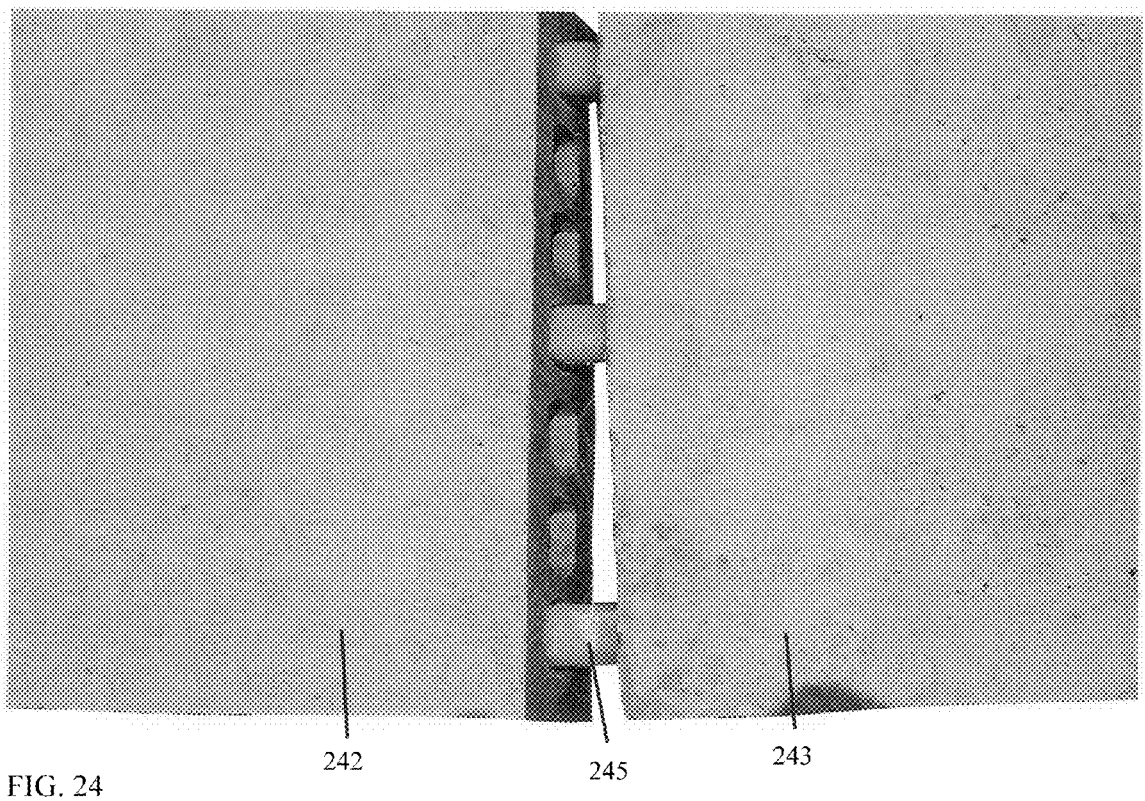
FIG. 24 depicts a portion of two representative articles connected with inserts.

Various shapes of inserts described herein are depicted in FIGS. 18-21 and 24 and serve as non-limiting examples. Adjacent articles may have only one insert or may have a number of inserts, as depicted in FIGS. 18, 21A, 21B and 24. FIGS. 18, 21A and 21B each show portions of one or more representative articles with inserts in at least one end opening. FIGS. 21B and 24 shows two articles. With FIG. 24, article 242 and 243 are adjacent each other and are each fitted with more than one insert, depicted as 245. Various representative end openings for receiving one or more inserts are shown in FIGS. 1-11, 13-17, 21A, 21B, and 22-24 and serve as non-limiting examples.

An insert, also referred to herein as a connector, may be made from any suitable material or may be of a composite material. Representative examples of materials used to make a connector include but are not limited to metal, plastic, rubber, foam, wood, formable sponge, and the like. The connector is generally engineered to have a shape that may be easily inserted into a hollow region of an article described herein. When a connector is inserted in an opening, it is generally well fit and is secure and thus less easy to pull out. In some forms, a connector may be further secured by one or more plugs. Additional connector shapes not illustrated are also suitable. At least one end opening of an article described herein is adapted to receive a connector configured to join together two adjacent articles positioned side by side. In one or more embodiments, a connector has a self-locking mechanism or a fastening/engaging/catching feature that further engages with the opening in the article. In certain implementations, a connector has a channel configured therein to permit air flow through the article or to allow water (e.g., moisture) to flow out from inside of the opening.

Articles having one or more shaped regions, whether hollowed, protruded or inverted, may be fitted with an end cap. Only one end of an article or both ends of an article may include an end cap. The end cap may cover the entire end of the article or only a portion thereof. The end cap is generally designed to close or seal one or more hollow regions present at the end of an article. An end cap may be shaped in a way that it assists in preventing water from reaching the interior of the article. End caps may be used to help keep insects from nesting inside or to prevent water from getting into an article at its end. The end cap may be for only a portion of the end, thus useful for closing only one opening or a few openings at the end of the article or may be designed to fit an entire end of an article so that all openings and hollowed regions are closed with a single end cap. In one example, an end cap may include a feature shaped similar to an insert that fits partially into an opening or hollowed region at the end of the article.

Figure 25:
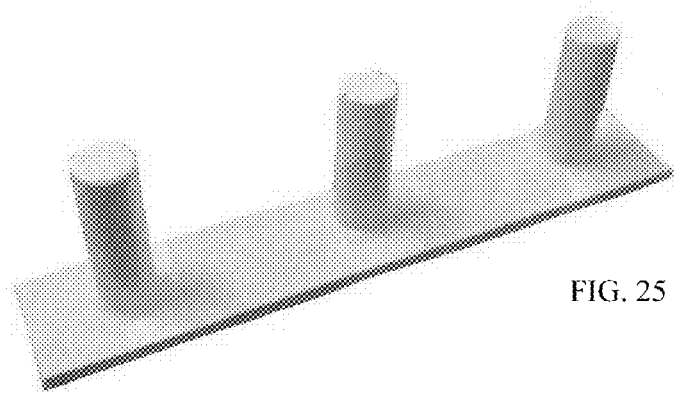
FIGS. 25 and 26 depict representative end plugs described herein.
Figure 26:
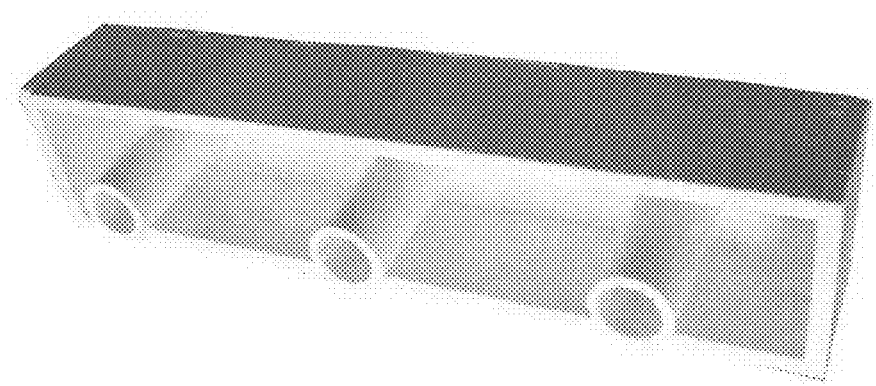

Examples of end caps are shown in FIGS. 25 and 26. Both of these figures show a single end cap that includes a number of insert-like features at its end. FIG. 25 is a representative end cap that will fit flush with the end of an article described herein and will generally fit to the entire end of the article. FIG. 26 is an end cap that will partly wrap around the end of an article described herein and, thus, fits to the entire end of the article.

Figure 27:
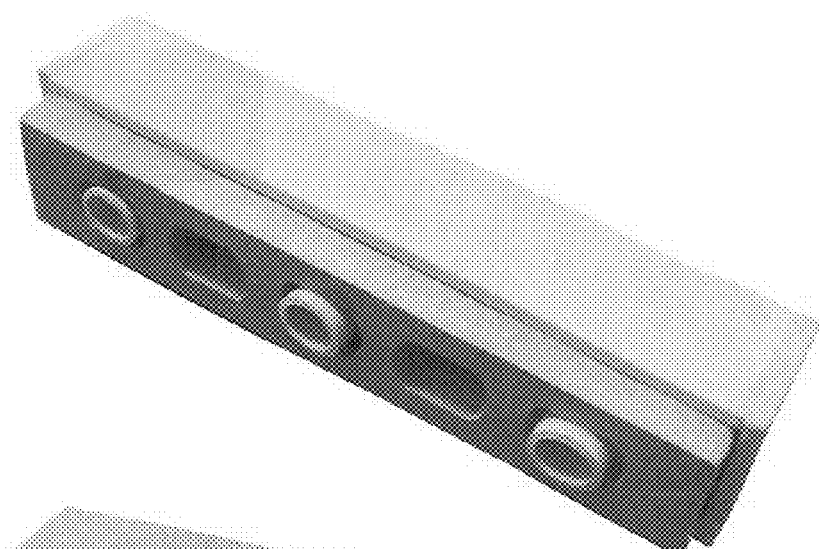
FIGS. 27 and 28 depict representative end plugs positioned at one end of an article described herein, showing only a portion of the article.

FIG. 27 depicts an end cap that is similar to that of FIG. 24 and shown positioned on an end of an article. The article is cut to show how the end cap fits into the one or more hollowed regions. In the figure shown, the article has some hollowed regions that are not filled with an insert-like feature of the end cap.

Figure 28:
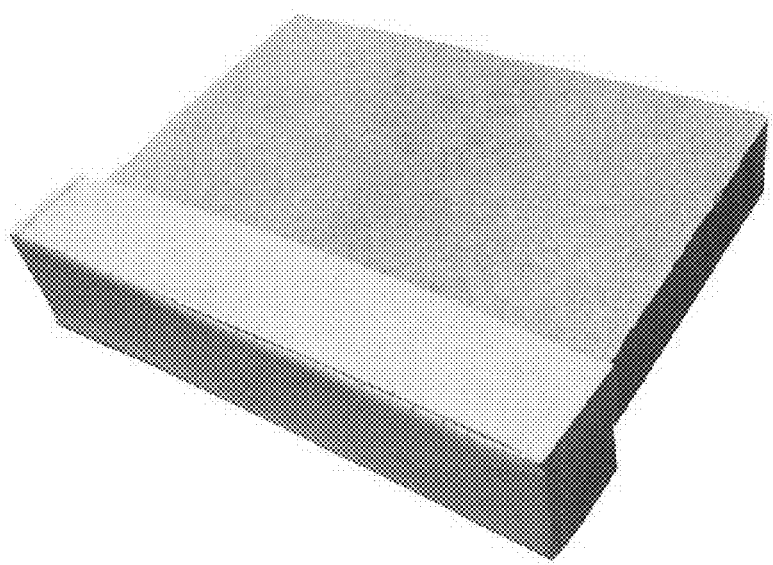

FIG. 28 depicts an end cap that is also similar to that of FIG. 24 when positioned on an end of an article and shown to wrap around the end of the article.

End caps may be made from any suitable material or composite of materials such as metal, plastic, rubber, foam, plastic, polymer composite, wood, formable sponge material, as examples. In some embodiments, end caps are manufactured and/or painted to match the color of the article. The end caps may be of any desired length. The length of the end cap may or may not match the full width of the article. Suitable length ranges for an end cap includes a range from at least about 1 inch to about 16 inches. The desired dimensions and additional features of the end cap will often depend on the width of the formed article, the thickness of the article end to be capped and/or the number of coverings to be capped.

Articles described herein are nailable. A nailable property may be reflected through the thickness of the article through which a given nail configuration may be driven without causing damage such as cracking or splitting of the article (e.g., when the nail is provided flush with the exterior surface at a distance away from the article edge). Nailability is also characterized by nail pull through, nail withdrawal and lateral nail resistance. Nailable articles are installed more easily and quickly than those that are not nailable. For articles described herein a standard nail gun may be used. Products that are not nailable need to be installed using screws, thus requires drilling, and/or some type of clip or hook, thus requiring more time and reduced consistency. Installation of articles described herein may be made using an automatic device, such as an electric or pneumatic nail gun. Nailability of articles described herein means that each nail installed, e.g., via an automatic device, is provided at a correct and visually pleasing height without requiring a range of pressure settings or numerous adjustments of the nail gun.

Forming shaped articles as described herein requires a formulation that comprises a hydraulic binder, one or more fiber sources, one or more siliceous sources with or without a thermoplastic agent. The hydraulic binder may be a single material or a composite, such as cement. Examples of binders include but are not limited to Portland cement, high alumina cement, gypsum, lime, ground furnace slag and the like as well as combinations thereof. The hydraulic binder generally represents about 20 wt. % to about 80 wt. % of the formulation. In some embodiments, the hydraulic binder is greater than about 30% by weight of the formulation. In other embodiments, the hydraulic binder is greater than about 38% by weight of the formulation. In some embodiments, the hydraulic binder is less than 70 wt. %, or is less than 60 wt. % of the formulation or is less than about 50 wt. % of the formulation. The binder may include one or more materials that add color to the formulation and thereby to the formed article. In addition or as an alternative, the formulation may include a tint or a material that offers a tint or that alters the color to the formulation when mixed and thereby colors or alters the color of the formed article.

Fibers used in formulations described herein may include a plant or wood based fiber, such as cellulose fiber, which may be bleached or unbleached. Selected plant or wood based fibers are generally hollow, light weight, multi-dimensional and provide excellent strength reinforcement when in the matrix of the formed articles. It has been found that a fiber dimension may be pre-selected to achieve a specific nailability, density and toughness of the product. The fiber may be about 0.05 mm to about 5 mm in length. In some embodiments, the fiber length is less than about 3 mm. The fiber length in some embodiments is greater than about 1 mm. The fiber diameter is generally between about 5 μm and 150 μm. A fiber used herein may be initially treated with one or more biocide agents to retard growth of fungi, bacteria, algae or lichen on or near the surface of the fiber or the adjacent cementitious matrix. A fiber used herein may also be initially treated with one or more water repelling agents to reduce water damage, thereby limiting water ingress into the cementitious matrix. The biocide and/or water repellent agent may instead or in addition be added to the formulation (e.g., to the admixture) rather than or in addition to being used to pre-treat the fiber.

Fibers for formulations described herein may further comprise or may be a high melting point polymer-based synthetic fiber. Examples of high melting point polymeric fiber are polypropylene, polyvinyl alcohol, aramid and the like. A polymeric fiber often has a higher viscoelastic performance than a wood based fiber, and therefore may provide a high flexibility and good performance characteristics to the fiber cement article when formed. The inventors have discovered that an autoclave temperature higher than the fiber melting temperature may be used for formulations described herein without impacting the integrity of the fiber when in a finished article. For example, although the melting point of one polypropylene fiber is 160° C., an autoclave temperature higher than the melting point temperature, including a temperature of 170° C. or 175° C. or 180° C., may be used without an apparent effect on fiber reinforcement. The fiber may further comprise an inorganic fiber, such as carbon fiber, an alkali resistant glass fiber and the like. An inorganic fiber when used may be in the form of a mesh, mat, or a continuous configuration.

In formulations described herein, a siliceous source may include one or more aggregates, such as ground silica, silica fume, fly ash, slag, clay, as examples including various combinations thereof. The siliceous source in the formulation is generally about 10 wt. % to about 70 wt. %. In some embodiments, the siliceous source is greater than about 20 wt. %. In other embodiments, it is greater than about 30 wt. %. In further embodiments, the siliceous source is less than about 60 wt. %. The siliceous source may be about or less than about 50 wt. %. The siliceous source may be ground to improve strength of the matrix, which may also affect hardening and/or curing of the article. In some embodiments, the surface area of ground particles may be at or less than about 500 $m^2/kg$ or may be at or less than about 450 $m^2/kg$. In additional embodiments, particles when ground may have a surface area that is less than about 400 $m^2/kg$. In some embodiments, particles may be at about or less than about 380 $m^2/kg$.

In many implementations, formulations described herein further comprise one or more low density additives. The low density additive may be one or more of a cenosphere, closed celled expanded perlite, open pore expanded perlite, calcium silicate hydrate, fly ash, organic or inorganic microspheres, as representative examples and various combinations thereof. Incorporating one or more low density additives has been found to reduce the true density of the matrix, thus contributing to a lowering of the apparent density of the article when formed.

One or more cement accelerants may also be included in formulations described herein. The accelerant may be represented by calcium silicate hydrate, calcium nitrate, calcium chloride, sodium nitrate, hexamethylenetetramine, recycled powder of a fiber cement product, a low density additive or the like and various combinations thereof. The accelerant may have a fast setting function, which allows an article when formed as a green fiber cement article to set and harden more quickly. This also allows a green article to be better handled after processing without damage to the green article. The accelerant may also be a fast curing agent. Rapid curing reduces the process time, thus reducing cost and allowing formed products to be manufactured and used more quickly. It has been found that an accelerant may be selected to change the chemical phase formed in the cured product, thus contributing to an altered and/or desired performance of the end product.

Formulations described herein may further comprise one or more viscosity or process enhancing agents. The viscosity enhancing agent may be selected from one or more of a plasticizer, super plasticizer, an emulsifier or thickener, such as methylcellulose, hydroxyl-ethyl cellulose, a cellulose ether or other suitable compound. The viscosity or process enhancing agent aids in the mixing and forming processes during manufacturing.

Still further, a formulation described herein may comprise one or more foaming agents or air entrapping agent or blowing agents and/or bubble stabilizers. A compound or chemical that helps to introduce gas pockets into the matrix of an article during fabrication may be considered to be a foaming agent or a blowing agent. Examples include a gas or a material that produces a gas, such as calcium carbonate hydrate, sodium bicarbonate, aluminum powder, as representative examples. Such materials are generally activated by heat or moisture and release gas such as carbon dioxide or hydrogen into the matrix thus introducing and forming one or more gas pockets or voids described previously. In some embodiments, voids may be further or in an alternative incorporated into the article by mechanical air entrainment, such as through rigorous mixing in the presence of air, or a gas, with or without an air entraining agent.

The formulations described thus far are on a dry mass basis. Water is further added into the formulation in a quantity less than about 75% the weight of the formulation on a dry mass basis. In many embodiments, the water content is less than 50% or is less than 40% or is less than 30% of the formulation (based on the dry weight).

Representative components and variations useful for making one or more articles described herein are provided in TABLE 1.

TABLE 1

| Raw Material | Possible range 1 (%) | Possible range 2 (%) | Possible range 3 (%) |
|---|---|---|---|
| cement | 20-80 | 30-50 | 20-60 |
| siliceous source | 10-70 | 20-40 | 20-60 |
| fiber A | 4-15 | 5-11 | 7-12 |
| fiber B | 0-5 | 0-3 | 0-5 |
| further aggregate | 0-20 | 5-15 | not necessary |
| low density additive | 0-20 | 5-15 | 6-12 |
| accelerating agent | 0-20 | 0-10 | 9-15 |
| emulsifier or thickener A | 0-5 | 0-3 | 0.6-1.5 |
| emulsifier or thickener B | 0-5 | 0.6-1.5 | 0-3 |
| plasticizer | 0-3 | 0-1.5 | 0-0.5 |

With various embodiments, such as those presented in TABLE 1, a cement may be in the form of Portland cement, as an example. A siliceous may be in the form of silica or sand, as examples. A fiber may be in the form of cellulose pulp and/or an engineered fiber, as examples. A further aggregate may be in the form of fly ash, as an example. An emulsifier or thickener may be in the form of methyl cellulose and/or hydroxyl ethyl cellulose, as examples. A plasticizer may be a superplasticizer, as an example.

TABLE 2 presents the apparent density, saturated MOR and saturated MOE for three representative articles described herein.

TABLE 2

| | Apparent density (g/cm$^3$) | MOR (MPa) | MOE (GPa) |
|---|---|---|---|
| Article A | 0.8 | 9.7 | 4.7 |
| Article B | 0.85 | 7.8 | 5.5 |
| Article C | 0.9 | 8.5 | 5.5 |

Article A was made with a formulation comprising about 40-49 wt. % cement, 30-38 wt. % siliceous source, 7-9 wt. % hammermilled cellulose fibers, 0.5-3 wt. % synthetic fibers, 8-11 wt. % low density additive and less than 3 wt. % of a viscosity enhancing agent. Articles B and C were made using a formulation comprising about 45-50 wt. % cement, 30-35 wt. % siliceous source, less than 7 wt. % hammermilled cellulose fibers, less than 3 wt. % synthetic fibers, 12-19 wt. % accelerant and less than 2 wt. % viscosity enhancing agent. In all formulations, the siliceous source was ground to produce particles having an average surface area of less than 400 m$^2$/kg. In all formulations, the cement calcium to cement silicate ratio ranged from 50:50 to 60:40.

Articles are processed by one of casting, molding, extruding, flow-on or other similar method for forming a monolithic structure. Raw materials may, thus, be modified as required and by the process used. With any process, raw materials are intimately mixed to form a homogeneous admixture. Raw materials may all be introduced at the beginning or some raw materials may be introduced into the formulation during processing (e.g., continuous processing). In some methods, including extrusion, raw materials may be introduced and mixed in the same process step. The admixture is then formed into a green article having a monolithic structure. A green article is an article formed from a formulation that consists of a hydraulic binder that has not yet been cured.

For many embodiments, articles are processed by extrusion whereby a certain die designs may be used to form one or more pre-formed hollow regions. When casting, molding, or using a flow-on method, a mold or form used may contain an insert with preformed shapes that define one or more hollow regions of the article or one or more channels.

In one or more embodiments, part of or the entire process may be carried out in a controlled environment, such as within a nitrogen or carbon dioxide environment, to ensure that the gas pockets or voids within the matrix contain the selected gas and are formed. Having a selected environment helps certain properties of the process, such as pre-curing, faster setting, pre-carbonation or others.

Heat may be optionally introduced to help curing and/or to trigger gas pocket formation. Optionally, the temperature of the process may be reduced to help retard curing or the triggering of gas pocket formation. When a blowing agent and/or a foaming agent is included in the formulation, gas pockets may be generated during the process naturally with mechanical mixing or by addition of an external heat source introduced during the process.

In some embodiments, the green article after forming may be finished, which may include subjecting the green article to embossing, pressing, stamping, brushing or the like to introduce a desired surface finish, surface design and/or surface effect. A green article is generally set and cured through an air cure, oven cure, and/or autoclave curing process to create a finished article. In some embodiments, sanding, cutting, machining, or brushing may be applied to the surface of the article after curing for further effect, as desired.

A representative method for manufacturing an article is illustrated in FIG. 30. In box 302, ingredients are selected and a paste is formed by mixing ingredients in accordance with known methods of mixing. In one embodiment, the paste is then processed using a single or twin-screw extruder. In box 304, a die is positioned and one or more hollow regions or profiles are created on the surface or within the monolithic material. Hollow regions may be formed by using a hollow structure former in the die. When incorporating a longer former, an addition may aid in improving surface finish, which can be smooth or textured. Shaped or hollow regions may also be formed in the monolithic material after the material has been formed as a green shaped article. For example, shaped regions may be formed by drilling out or routering regions after the article has been formed or after the article has been cured. In some embodiments air is introduced by injection to generate voids and a porous structure to the paste. In still further embodiments, a foaming agent and/or bubble stabilizer is additionally or alternatively added to promote generation of voids having a smaller size and to promote homogenous distribution of voids. In box 306, the article is formed, such as by molding or is extruded. A surface finish may be applied to the article as the material exits the die. In some embodiments, the finish is applied by a device, such as an embossing roller, press, sander, brush, finish machine or the like. In box 308, the article is dried and cured using cycles known in the art for monolithic cementitious structures. Some modifications to the drying process may occur for articles having less mass and thus, requiring less time to dry and/or cure. In some forms, articles described herein when cured are elongated. In box 310, the formed article is optionally cut and/or further coated as needed or as desired. Coating may include a tint and may be done by those method known in the relevant art, such as spray drying, curtain coating, as examples. In box 312, the formed article is generally stacked, packaged, and made ready to ship for use in the field. The article may be stored before use.

In a first example, fiber cement trim boards were formed having final dimensions of ¾ inch thickness, 10 feet in length, and made with various widths. The formulation for the articles on a dry weight basis included 9% cellulose fiber, 3% polypropylene fiber, 38% Portland cement, 2-3% ground fly ash, 15% ground silica, 3% silica fume, 3% low density calcium silicate hydrates, 3% hydroxyl ethyl cellulose, and 2% sodium bicarbonate. Water was further added to the formulation up to 53% of the weight of the formulation on a dry basis. The formulation and water were blended together to create a substantially homogeneous paste. The paste was extruded through a pre-selected die to produce green fascia boards. The die was designed with cylindrical parts along the die length to introduce round-shaped hollow regions in each board. While the example included a die with cylindrical parts, it is noted that any other shape may be used as described previously and/or as illustrated in the drawings. Following extrusion, the boards were left to set at 25° C. and 25% relative humidity for about 24 hours, then cured in an autoclave for about 8 hours at 165° C. The fiber cement boards as formed were lightweight and suitable for use as trim under.

Figure 32B:
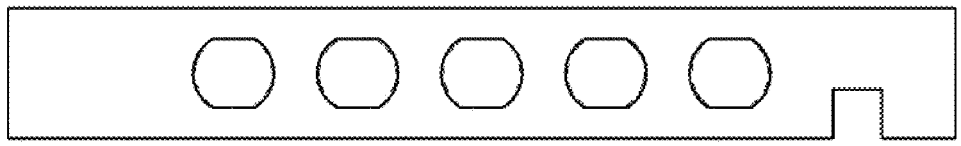
Figure 32A:
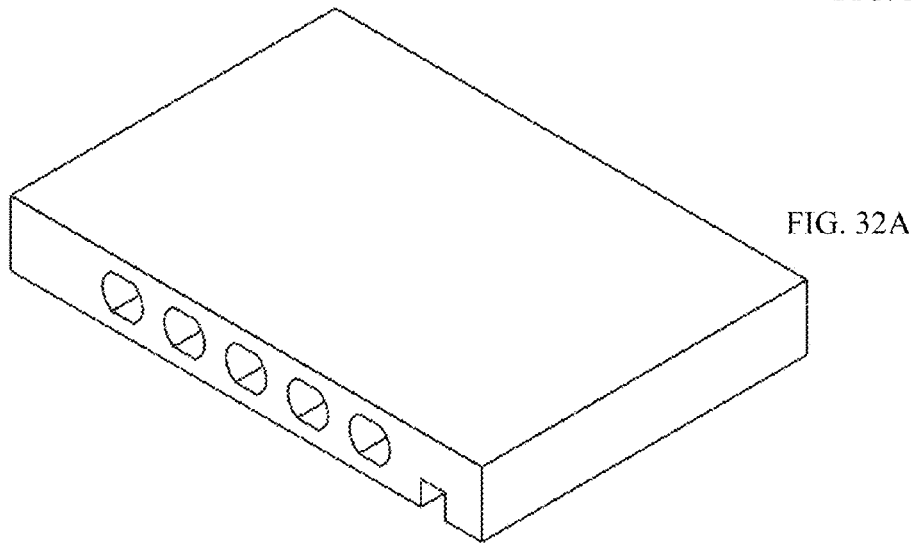

In another example, fiber cement fascia boards were formed having final dimensions of 1 inch in thickness, 12 feet or 16 feet in length, and 5.5 or 7.25 inches in width. The formulation for the articles on a dry weight basis included 7% cellulose fiber, 1% synthetic fiber, 42-48% cement, 10% low density additive, 32-38% fine ground silica, and 0.9-1.4% viscosity enhancing agent. Water was further added to the formulation up to 70% of the weight of the formulation on a dry basis. The formulation and water were blended together to create a substantially homogeneous paste. Air was then introduced. In addition, a foaming agent or bubble stabilizer was added. The paste was extruded through a pre-selected die with pre-selected hollowed portions along the die length to produce green fascia boards having a substantially oval-shaped hollow regions, such as those depicted in either of FIG. 31 or 32, in which FIGS. 31A and 32A depict a perspective view of a portion of the board (length not to scale) and FIGS. 31B and 32B depict an end view of the board. FIG. 31 depicts a board width of 5.5 inches and FIG. 32 depicts a board width of 7.25 inches. The figures further show a notched portion that may be introduced before or after curing Embodiments having a notched portion may be fit cooperatively with a second panel, such as a soffit. Following extrusion, the boards were left to set at 25° C. and 25% relative humidity for about 24 hours, then cured in an autoclave for about 8 hours at 165° C. The fiber cement boards when formed were lightweight and suitable for use as fascia.

Figure 33A:
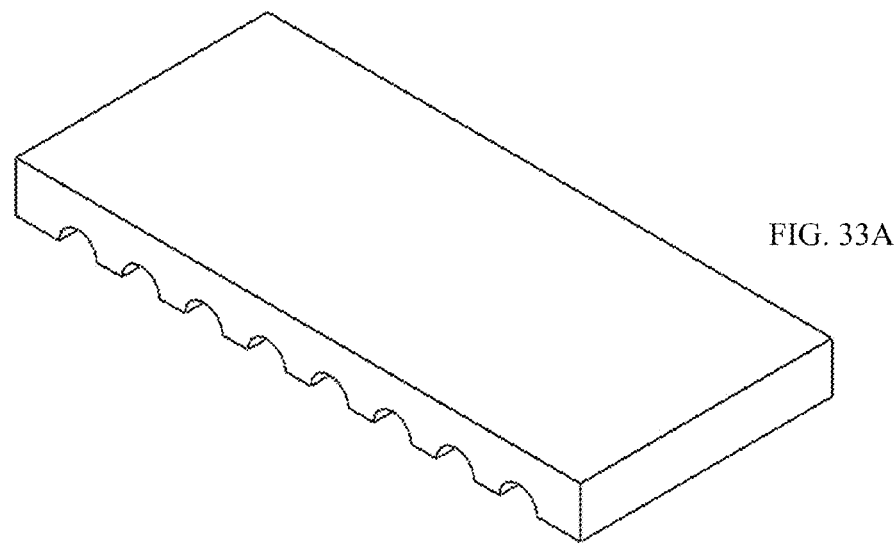
Figure 33B:
Figure 34A:
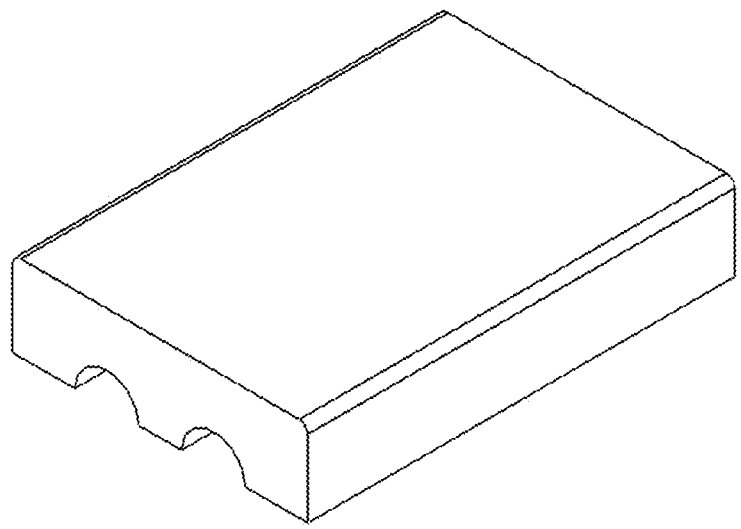
Figure 34B:
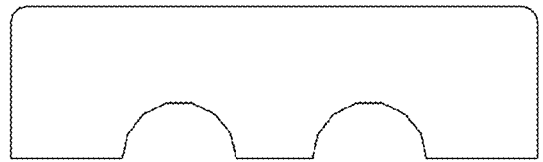

In further example, fiber cement trim boards were formed having final dimensions of 1 inch in thickness, 12 feet in length, and 3.5 or 4.5 or 5.5 or 7.25 or 11.25 inches in width. The formulation for the articles on a dry weight basis included 4% cellulose fiber, 1-2% synthetic fiber, 45-50% cement, 15% accelerant, 30-35% fine ground silica, and less than 1% viscosity enhancing agent. Water was further added to the formulation up to up to 65% of the weight of the formulation on a dry basis. The formulation and water were blended together to create a substantially homogeneous paste. Air was then introduced. In addition, a foaming agent or bubble stabilizer was added. The paste was extruded through a preselected die to produce green trim boards. Examples of final boards are depicted in either of FIG. 33 or 34, in which FIGS. 33A and 34A depict a perspective view of a portion of the board (length not to scale) and FIGS. 33B and 34B depict an end view of the board. FIG. 33 depicts a board width of 3.5 inches and FIG. 34 depicts a board width of 11.25 inches. Following extrusion, the boards were further shaped and grooved and were then left to set at 25° C. and 25% relative humidity for about 24 hours, then cured in an autoclave for about 8 hours at 165° C. The trim boards when formed were lightweight and suitable for use as trim under, for example, the 2003 International Residential Code for One- and Two-Family Dwellings, Section R703.1.

Figure 29:
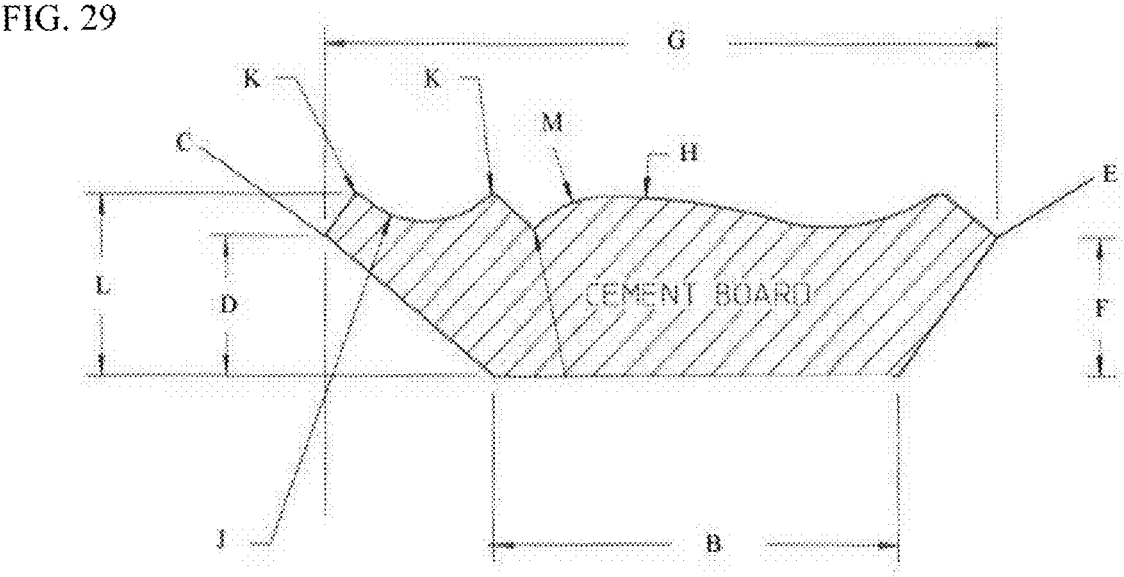
FIG. 29 depicts a representative formed article in cross-section as described herein having more than one shaped region.

FIG. 29 shows in cross section a shaped article in the form of a crown moulding. The article has a base surface with a base width B. In this embodiment, a first side edge C of the article extends along an angle that is 38° from the base surface to a height of D relative to the base surface and a second side edge E of the article extends along an angle 53° from the base surface to a height F relative to the base surface. In one embodiment, base width B, height D, height F, top width G, and height L may be approximately 1.959 inches, 0.637 inches, 0.631 inches, 3.25 inches, and 0.827 inches, respectively. In another embodiment, base width B, height D, height F, top width G, and height L may be approximately 4.32 inches, 0.461 inches, 0.452 inches, 5.25 inches, and 0.768 inches, respectively.

When formed, an article described herein may have a somewhat flattened appearance, such as a panel or board. In addition, the article when formed may be of varying thicknesses. Generally, an article described herein may be installed as an equal alternative to conventional boards. Articles described herein may be used as decorative non-load bearing panels, such as fascia or trim or crown moulding.

In one form, articles described herein are installed over a wood framing (complying with local building codes). In further embodiments, articles described herein may be installed to metal framing (with or without assistance of added or concealed fastenings). In other embodiments, articles described herein are installed at corners, band boards and around windows and doors, and as rake and frieze. In some instances, the article is configured to cover roof joist ends under the eaves of a building structure. In some embodiments, an article (352) described herein is mounted perpendicularly across the ends of roof joists with its exterior side lying parallel to an exterior wall (354) as shown in FIG. 35. In addition, some articles described herein may include a first article (352) adapted to engage with the interior side of a second panel (356) and extend between the second panel and the wall (354) so as to bridge the gap between the second panel and a wall as illustrated in FIG. 35. The first article and second panel may both comprise articles described herein or may be configured differently. The first article (362) and a second panel (366) may also be installed together as a system as shown in FIG. 36. When the first article and second panel are along a roof edge, the system may close the underside of the roof so as to improve the appearance of a building structure. The first and second panel, whether both made of articles described herein, may also aid in protecting the underside of eaves from weathering and insects as well as reducing temperature fluctuations in an attic by aiding with proper ventilation.

An article (362) may be fastened over a 2× sub-fascia (364) as shown in FIG. 36 (which may be cooperative with a soffit (366)) or directly to 2× rafter tails. When installing an article over a solid 2× sub-fascia, minimum two-inch, 16-gauge corrosion-resistant finish nails are generally used. Generally, when installing directly to rafter tails, joints of articles described herein are to be installed off rafter with 2× blocking installed behind the joint. When applying an article herein direct to rafter tails (e.g., without the presence of a 2× sub-fascia), a minimum 6 d siding common corrosion resistant nail is generally used to attach to a wood frame construction. Finish nails are only used when attaching an article to a 2× sub-fascia. Generally, nails are positioned no closer than about 1¼ inch from the edges and should be no closer than one inch from the ends of the article. Fastener spacing generally has a maximum of 24 inches o.c. when installing directly to rafter tails and is generally spaced a maximum 16 inches o.c. when installing over 2× sub-fascia. Flashing of all horizontal protruding and exposed articles is also important. Roof sheathing is not generally fastened to an article described herein.

Articles described herein may be installed directly to a building, such as a frieze board to framing, or around corners as is depicted in FIG. 37, which shows article 376, corner stud (372) and finishing nail (374). Concealed fastenings may also be used, which are positioned to the back side of the article and then further fastened to the framing. For fascia, rake, trim, band board, and frieze board applications, 2 inch long minimum 16 gauge galvanized finish nails should be used to attach articles described herein. Placement of the nails may be every 16 inches o.c. for fascia, rake, and frieze board applications. In addition, finish nails are generally positioned no closer than ½ inch from the long edges and no closer than 1 inch from the ends of the article. Fasteners, positioned at a maximum of 24 inches o.c., may be used with articles placed as band board or around windows, doors and other openings, especially when openings are greater than four feet.

FIG. 36 depicts an article as a rake piece (367) installed at a corner and positioned behind a front piece (369). In some embodiments, the bottom end of the rake piece should be cut off to provide an even surface with the front piece. Butt joints are often installed off rafter with a 2× blocking installed behind the joint. A bevel cut of about 22.5° to 45° is often used when joining two articles described herein. FIG. 36 further illustrates a soffit panel (366) and 2× fascia (364).

FIG. 38 depicts an article (381) formed and positioned as crown moulding with another article described herein (382) provided as a fascia board and still another article described herein (383) provided as a trim board. The installation of said articles includes wall siding (387), soffit (388), a weather resistive barrier (386), and sheathing (384).

When positioning articles described herein as crown moulding, 2.5 inch minimum 16 gauge finish nails should be used. Fasteners may be used when installing as crown moulding boards to a steel frame construction. One example of a suitable fastener is from ET&F Fastening Systems, Inc. (Ohio, U.S.). Generally, nails should be positioned no closer than 0.5 inches from the edges and 1 inch from ends of the article and spaced at a maximum of 16" o.c.

Figure 39:
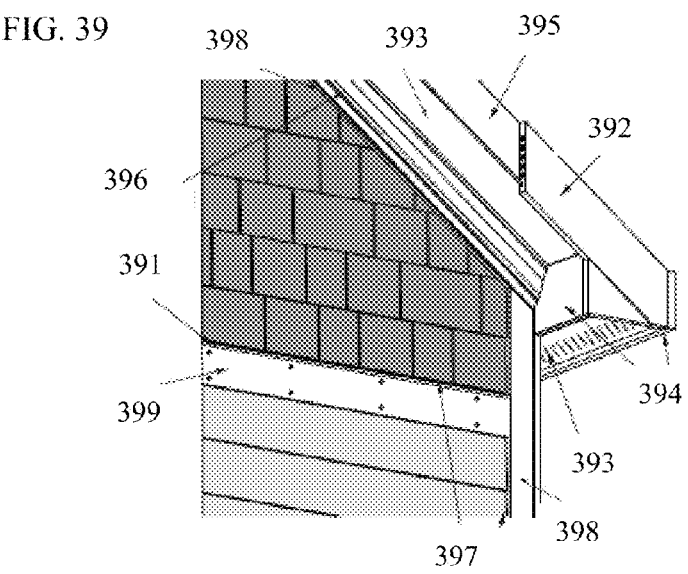

FIG. 39 depicts an article (392) formed and positioned as a rake with another article described herein (394) provided as a fascia board, a further article provided as crown moulding (396), still other articles described herein (398) provided as a trim board and an additional article as a band board (399). The installation of said articles includes flashing (391), soffit (393), a 2× sub fascia (395) and a gap (397), which can be a minimum ⅛ inch.

Fastening instructions are similar for most applications when using articles described herein. Generally, all fasteners used with articles described herein should be corrosion resistant, galvanized, or stainless steel. Stainless steel fasteners are good. Electro-galvanized fasteners are acceptable but may exhibit premature corrosion. Quality, hot-dipped galvanized nails are good. Articles described herein may be hand nailed or fastened with a pneumatic tool. Pneumatic fastening is in many instances more suitable when installing an article described herein. Nails should be driven flush to the article. A flush mount attachment on the pneumatic tool is good and will help control the depth the nail when driven. In some embodiments, a setting that under drives the nail may be used. Under driven nails may be further driven snug with a smooth faced hammer. Fasteners should be driven perpendicular to the framing. Nails should not be driven at an angle. For wood framing, under driven nails may be driven flush to the trim with a smooth faced hammer. Aluminum fasteners, staples, or clipped head nails are not generally suitable with articles described herein.

After installation, an article may be further caulked, painted and/or primed. Such further steps are useful for field cut edges. When caulking, good results have been found with an elastomeric joint sealant, such as one complying with ASTM C920 Grade NS, Class 25 or higher, or a latex joint sealant complying with ASTM C834. Caulking, when applied, should be applied in accordance with the manufacturer's written instructions and/or with ASTM C1193. Color matched caulks may be available.

Some articles may be pre-painted or pre-primed and may include a laminate sheet on the primed or painted surface(s). With installation of primed and/or painted articles, the laminate sheet will face the outside when installing the article. The laminate sheet should be removed as soon as possible after nailing. Any nail head touch up may be done before or after removal of the laminate sheet. One method is to touch-up while the laminate sheet is in place and then remove the laminate sheet before the paint dries. Further painting or touching up may also be done after the article is installed. Touch up is generally for nicks, scrapes and nail heads. If large areas require touch-up, one option is to replace the damaged area with new and painted article. Non-factory cut edges should be treated with an edge coater.

Generally, installed articles (e.g., those not pre-painted) should be painted within about 180 days for an article that is pre-primed and within about 90 days for an article that is unprimed. 100% acrylic topcoats are recommended. Articles should not be painted when wet. The rate of paint application should be in accordance with the manufacturer's specifications. If an article is sprayed, back-rolling should in many instances also be performed.

The shaped articles described herein have a low density, are nailable and exhibit good strength, and good durability. Because of the reduced mass and/or apparent dry density of articles described herein, said articles are unlike other articles produced by alternative processes. The articles herein, unlike other cementitious articles formed by alternative processes, may, when including the processes and formulations described, be initially prepared as long articles, useful for building products, such as siding, panel, trim, fascia, roofing, crown moulding, decking, or fencing.

Although the foregoing description of many embodiments has shown, described and pointed out the fundamental novel features of the invention, it will be understood that various omissions, substitutions, and changes in the form of the detail of the invention as illustrated as well as the uses thereof, may be made by those skilled in the art, without departing from the scope of the invention. Consequently, the scope of the invention should not be limited to the foregoing discussions.

The invention claimed is:

1. An article for a building structure comprising a monolithic cementitious matrix formed in the configuration of a trim, said cementitious matrix having two opposing longitudinal sides, a pre-formed shaped region disposed on one of the longitudinal sides, said pre-formed shaped region comprises a plurality of inflected regions and protruded regions which together define first and second elongate open channels extending in a direction parallel to the length of the cementitious matrix, wherein the other one of the longitudinal sides comprises a continuous planar surface, said cementitious matrix is nailable and comprises an end portion having at least one opening, wherein the article is non-load bearing and the thickness of the article, measured as the shortest distance between two generally planar surfaces, is about 3 inches or less.

2. The article of claim 1, wherein the article has an apparent density less than about 0.9 g/cm$^3$.

3. The article of claim 1, wherein the pre-formed shaped regions reduces the apparent density of the article by about 10% or more.

4. The article of claim 1, wherein the at least one opening having a cross-sectional shape selected from the group consisting of polygon, square, rectangle, triangle, circle, oval, trapezoid, and combinations thereof.

5. The article of claim 1, wherein the channels do not have the same configuration.

6. The article of claim 1, wherein the article further comprises voids within the cementitious matrix, said voids being formed by gas pockets.

7. The article of claim 1, wherein the article has a thickness of about ¾ inch or greater.

8. The article of claim 1, wherein the article further comprises a finish on at least one surface.

9. The article of claim 1, wherein the shaped region on an end of the article is cooperative with a shaped region on an end of a second article thereby allowing the two articles to be joined together.

10. The article of claim 1, wherein the at least one opening is configured to fit an insert.

11. The article of claim 1, wherein the article has an apparent stress to density ratio of at least about 8 MPa/(g/cm$^3$)$^3$ or higher.

12. The article of claim 1, wherein the article is about 12 feet or longer.

13. The article of claim 1, wherein the article does not require pre-drilled holes for fastening.

* * * * *